US008673156B2

(12) United States Patent
Griffin et al.

(10) Patent No.: US 8,673,156 B2
(45) Date of Patent: Mar. 18, 2014

(54) SUSPENSION LIQUID EXTRACTION APPARATUS AND METHOD

(75) Inventors: William Tid Smith Griffin, Hawesville, KY (US); Joshua Michael-James DeArmond, Greenville, KY (US)

(73) Assignee: Gryphon Environmental, LLC, Hawesville, KY (US)

( * ) Notice: Subject to any disclaimer, the term of this patent is extended or adjusted under 35 U.S.C. 154(b) by 756 days.

(21) Appl. No.: 12/587,137

(22) Filed: Oct. 2, 2009

(65) Prior Publication Data
US 2010/0213141 A1 Aug. 26, 2010

Related U.S. Application Data

(60) Provisional application No. 61/194,999, filed on Oct. 2, 2008.

(51) Int. Cl.
*B01D 37/00* (2006.01)
*B01D 33/052* (2006.01)
*B01D 33/64* (2006.01)
*B01D 33/66* (2006.01)

(52) U.S. Cl.
USPC .......... 210/748.01; 210/748.07; 210/770; 210/771; 210/774; 210/783; 210/808; 210/175; 210/177; 210/178; 210/400; 210/406; 210/416.1; 34/245; 34/259; 34/398; 34/403; 34/404; 34/417; 34/424; 34/443; 34/451; 34/452

(58) Field of Classification Search
None
See application file for complete search history.

(56) References Cited

U.S. PATENT DOCUMENTS

| | | | | | |
|---|---|---|---|---|---|
| 1,881,404 | A | * | 10/1932 | Hadley | 162/208 |
| 2,736,434 | A | * | 2/1956 | Yacoe | 210/178 |
| 2,821,304 | A | * | 1/1958 | Zarchin | 62/535 |
| 2,867,326 | A | * | 1/1959 | Hirs | 210/104 |
| 3,294,554 | A | * | 12/1966 | Osborne et al. | 426/470 |
| 3,443,695 | A | * | 5/1969 | O'Neill | 210/251 |
| 3,454,970 | A | * | 7/1969 | Sutherland | 8/156 |
| 3,497,063 | A | * | 2/1970 | Hirs | 210/777 |
| 3,515,199 | A | | 6/1970 | Summers | |
| 3,559,807 | A | * | 2/1971 | Reilly | 210/769 |
| 3,564,631 | A | * | 2/1971 | Burling | 8/156 |
| 3,731,808 | A | * | 5/1973 | Rickert | 210/138 |
| 3,814,688 | A | * | 6/1974 | Hirs | 210/297 |
| 3,826,369 | A | * | 7/1974 | Murata et al. | 210/798 |
| 3,899,426 | A | * | 8/1975 | Hirs | 210/387 |
| 4,043,047 | A | * | 8/1977 | Galliker | 210/748.01 |
| 4,097,306 | A | * | 6/1978 | Carman | 134/10 |
| 4,116,843 | A | * | 9/1978 | Koenig | 210/391 |
| 4,159,247 | A | * | 6/1979 | Wykoff et al. | 210/767 |

(Continued)

OTHER PUBLICATIONS

The State Intellectual Property Office of China, Office Action issued in corresponding Chinese application 200980147595.0, issued Mar. 29, 2013.

*Primary Examiner* — Robert James Popovics
(74) *Attorney, Agent, or Firm* — Stites & Harbison, PLLC; David W. Nagle, Jr.

(57) ABSTRACT

The present invention relates to an apparatus for removing liquid from a suspension. More particularly, the present invention relates to a filtration apparatus using vacuum pressure, compressed air and radiant heat to facilitate extraction of water from a suspension and an air flow within the vacuum chamber to remove the evaporate as a cost-efficient and resource-efficient means of filtering and drying solids in large volumes of suspension to remove interstitial and chemically bound liquids, resulting in up to 100% total solids.

14 Claims, 17 Drawing Sheets

(56) References Cited

U.S. PATENT DOCUMENTS

| | | | |
|---|---|---|---|
| 4,203,836 A * | 5/1980 | Hallack et al. | 210/665 |
| 4,230,572 A * | 10/1980 | Hirs | 210/767 |
| 4,233,157 A * | 11/1980 | Miller | 210/137 |
| 4,267,060 A * | 5/1981 | Miller | 210/741 |
| 4,477,350 A * | 10/1984 | Brandt et al. | 210/387 |
| 4,477,358 A * | 10/1984 | Heintges et al. | 210/783 |
| 4,568,460 A * | 2/1986 | Bratten | 210/387 |
| 4,664,813 A * | 5/1987 | Schneider | 210/771 |
| 4,680,088 A * | 7/1987 | Bastanzuri | 162/4 |
| 4,719,772 A * | 1/1988 | Bastanzuri | 68/205 R |
| 4,756,092 A * | 7/1988 | Anderson et al. | 34/424 |
| 4,788,778 A * | 12/1988 | Fernwood | 34/92 |
| 4,812,295 A * | 3/1989 | Bresowar | 422/169 |
| 4,831,746 A * | 5/1989 | Kim et al. | 34/421 |
| 4,887,362 A * | 12/1989 | Rautakorpi | 34/394 |
| 4,908,136 A * | 3/1990 | Chou et al. | 210/661 |
| 4,915,850 A * | 4/1990 | Onnes | 210/771 |
| 4,916,937 A * | 4/1990 | Robertson et al. | 405/270 |
| 4,944,870 A * | 7/1990 | Yagishita et al. | 210/103 |
| 4,985,152 A * | 1/1991 | Hilbig et al. | 210/771 |
| 5,059,318 A * | 10/1991 | Benesi | 210/227 |
| 5,091,079 A * | 2/1992 | Gayman | 210/175 |
| 5,128,029 A * | 7/1992 | Herrmann | 210/107 |
| 5,133,883 A * | 7/1992 | Prinssen | 210/783 |
| 5,173,272 A * | 12/1992 | Roland | 422/295 |
| 5,203,996 A * | 4/1993 | Scheucher et al. | 210/386 |
| 5,209,841 A * | 5/1993 | Bratten | 210/107 |
| 5,221,472 A * | 6/1993 | Ikeda et al. | 210/389 |
| 5,233,763 A * | 8/1993 | Minnie, Jr. | 34/267 |
| 5,246,574 A * | 9/1993 | Jorgens | 210/180 |
| 5,292,434 A * | 3/1994 | Benesi | 210/770 |
| 5,308,487 A * | 5/1994 | Thissen | 210/400 |
| 5,366,626 A * | 11/1994 | Pierson | 210/216 |
| 5,368,732 A * | 11/1994 | Pierson | 210/386 |
| 5,382,327 A * | 1/1995 | Seifert et al. | 162/317 |
| 5,384,014 A * | 1/1995 | Bliss | 162/317 |
| 5,399,332 A * | 3/1995 | Pu | 423/478 |
| 5,426,864 A | 6/1995 | Svehaug et al. | |
| 5,445,746 A * | 8/1995 | Lee | 210/783 |
| 5,449,455 A * | 9/1995 | Womack | 210/224 |
| 5,462,677 A * | 10/1995 | Benesi | 210/791 |
| 5,482,594 A * | 1/1996 | Salminen | 162/60 |
| 5,510,025 A * | 4/1996 | Benesi | 210/227 |
| 5,527,458 A * | 6/1996 | Gehrmann et al. | 210/177 |
| 5,540,846 A * | 7/1996 | Koch et al. | 210/741 |
| 5,545,560 A * | 8/1996 | Chang | 435/290.2 |
| 5,573,667 A * | 11/1996 | Benesi | 210/400 |
| 5,595,654 A * | 1/1997 | Caughman, Jr. | 210/323.1 |
| 5,643,468 A * | 7/1997 | Ure | 210/771 |
| 5,707,512 A * | 1/1998 | Koch et al. | 210/136 |
| 5,707,535 A * | 1/1998 | Harris | 210/804 |
| 5,840,187 A * | 11/1998 | Derenthal et al. | 210/400 |
| 5,974,821 A * | 11/1999 | Scherer et al. | 62/303 |
| 6,004,461 A * | 12/1999 | Harris | 210/241 |
| 6,086,713 A * | 7/2000 | Qvintus et al. | 162/60 |
| 6,110,388 A * | 8/2000 | Norais et al. | 210/770 |
| 6,159,338 A * | 12/2000 | Qvintus et al. | 162/56 |
| 6,159,359 A * | 12/2000 | Benesi | 210/87 |
| 6,233,962 B1 * | 5/2001 | Scherer et al. | 62/303 |
| 6,350,377 B1 * | 2/2002 | Kollmar et al. | 210/198.1 |
| 6,495,031 B1 * | 12/2002 | Bratten | 210/97 |
| 6,521,135 B1 * | 2/2003 | Benesi | 210/771 |
| 6,622,870 B1 * | 9/2003 | Prinssen | 210/398 |
| 6,846,421 B2 * | 1/2005 | Bratten | 210/741 |
| 7,011,741 B2 * | 3/2006 | Benesi | 210/97 |
| 7,028,414 B2 * | 4/2006 | Vonplon | 34/236 |
| 7,029,579 B2 * | 4/2006 | Tapp | 210/193 |
| 7,381,329 B1 * | 6/2008 | Moss | 210/255 |
| 7,531,086 B2 * | 5/2009 | Benesi et al. | 210/143 |
| 7,614,503 B2 * | 11/2009 | Marchal | 210/401 |
| 7,651,619 B2 * | 1/2010 | Hansen et al. | 210/695 |
| 7,674,386 B2 * | 3/2010 | Benesi | 210/741 |
| 7,815,808 B2 * | 10/2010 | Benesi et al. | 210/741 |
| 8,545,133 B2 * | 10/2013 | Fumita et al. | 406/187 |
| 2002/0113014 A1 * | 8/2002 | Stroup | 210/637 |
| 2003/0000228 A1 | 1/2003 | Leuenberger et al. | |
| 2003/0121843 A1 * | 7/2003 | Bratten | 210/398 |
| 2004/0134863 A1 * | 7/2004 | Tapp | 210/783 |
| 2005/0241173 A1 * | 11/2005 | Vonplon | 34/68 |
| 2006/0027509 A1 * | 2/2006 | Benesi et al. | 210/770 |
| 2006/0102545 A1 * | 5/2006 | Benesi et al. | 210/224 |
| 2006/0102565 A1 * | 5/2006 | Alford | 210/770 |
| 2006/0283785 A1 * | 12/2006 | Benesi | 210/85 |
| 2007/0256984 A1 * | 11/2007 | Benesi et al. | 210/741 |
| 2007/0278143 A1 | 12/2007 | Griffin | |
| 2009/0226840 A1 * | 9/2009 | Fumita et al. | 430/137.1 |
| 2010/0096341 A1 * | 4/2010 | Benesi | 210/771 |
| 2010/0213141 A1 * | 8/2010 | Griffin et al. | 210/774 |
| 2011/0089122 A1 * | 4/2011 | Smith | 210/774 |
| 2013/0109814 A1 * | 5/2013 | Takasugi et al. | 525/338 |

* cited by examiner

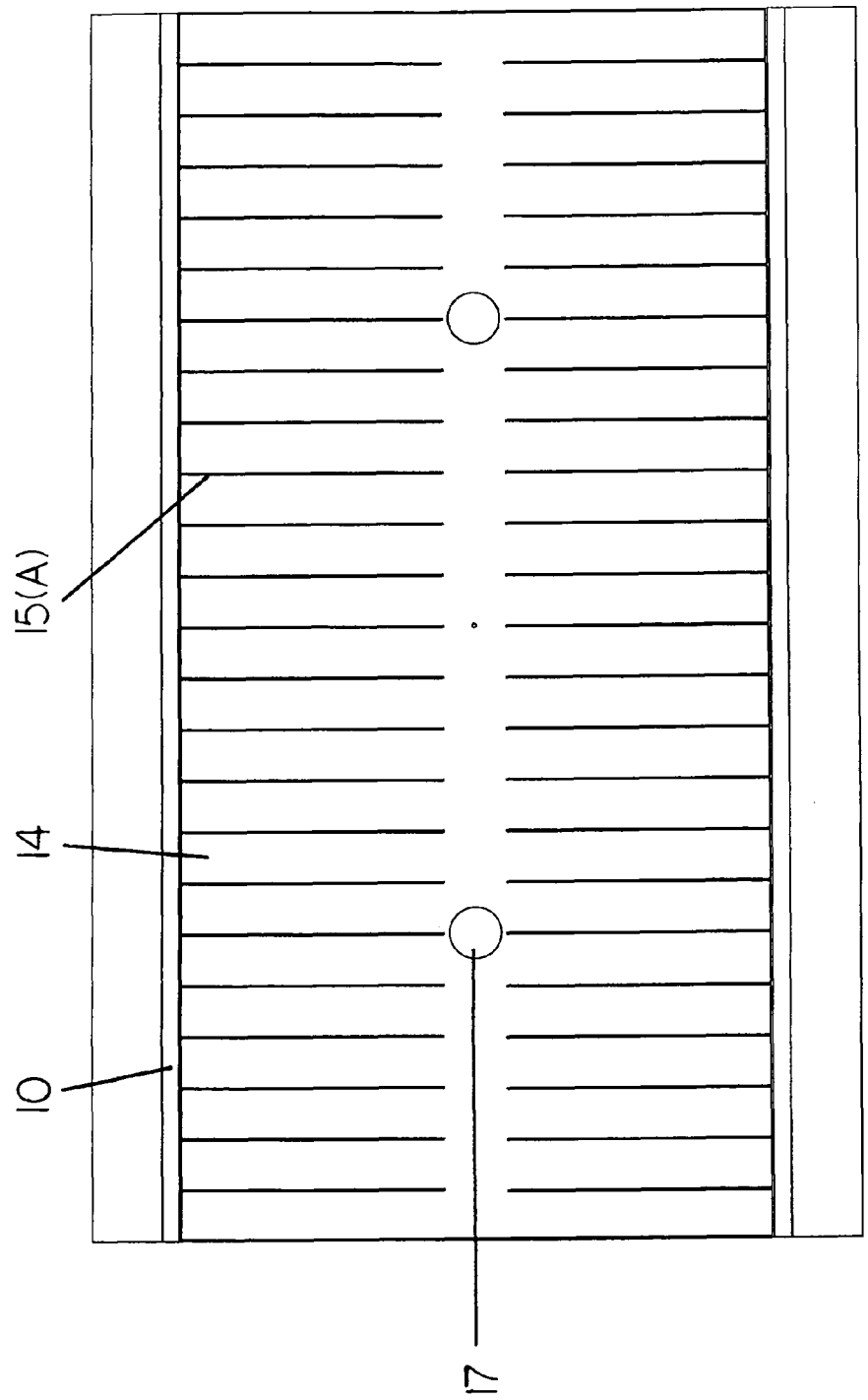

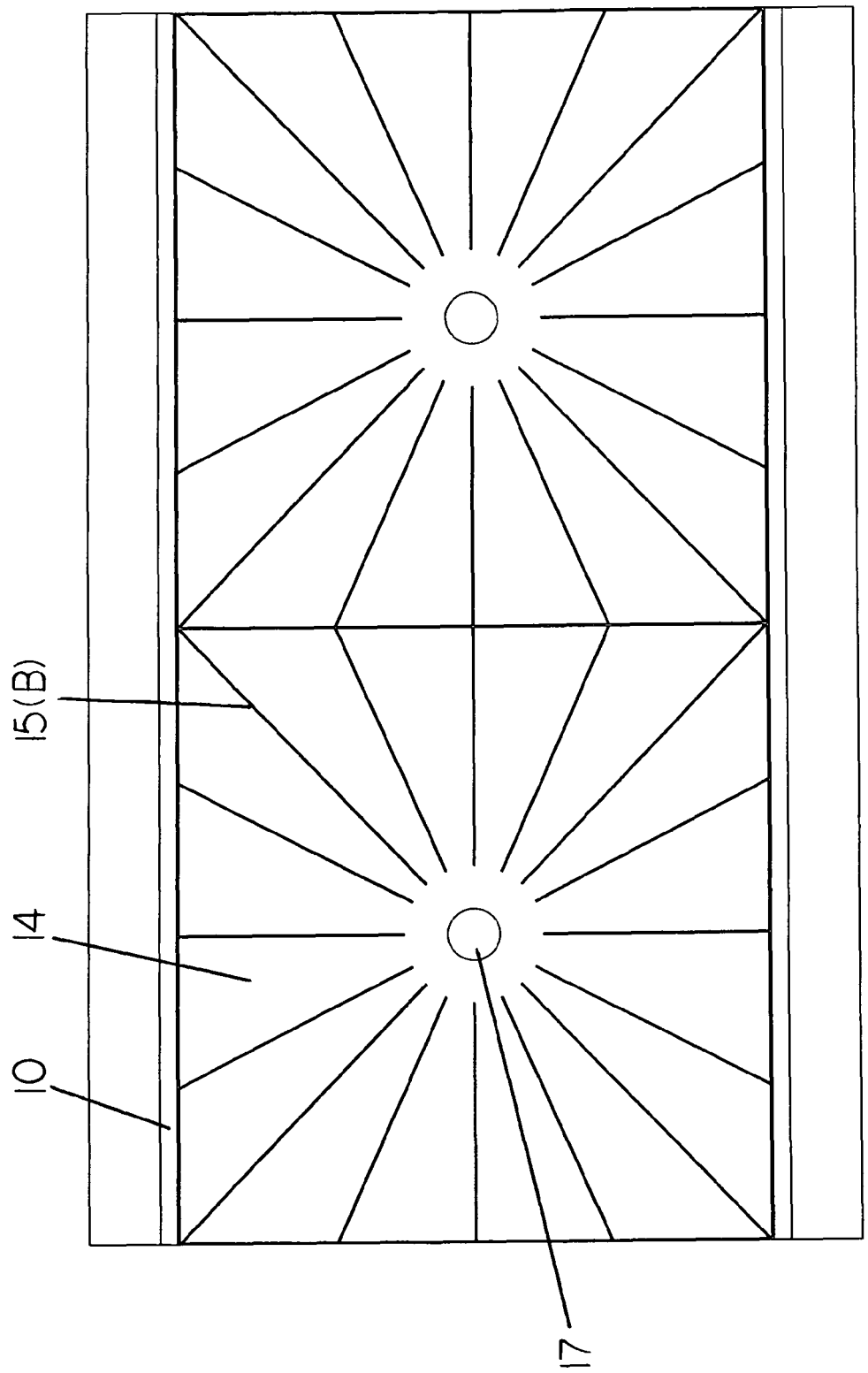

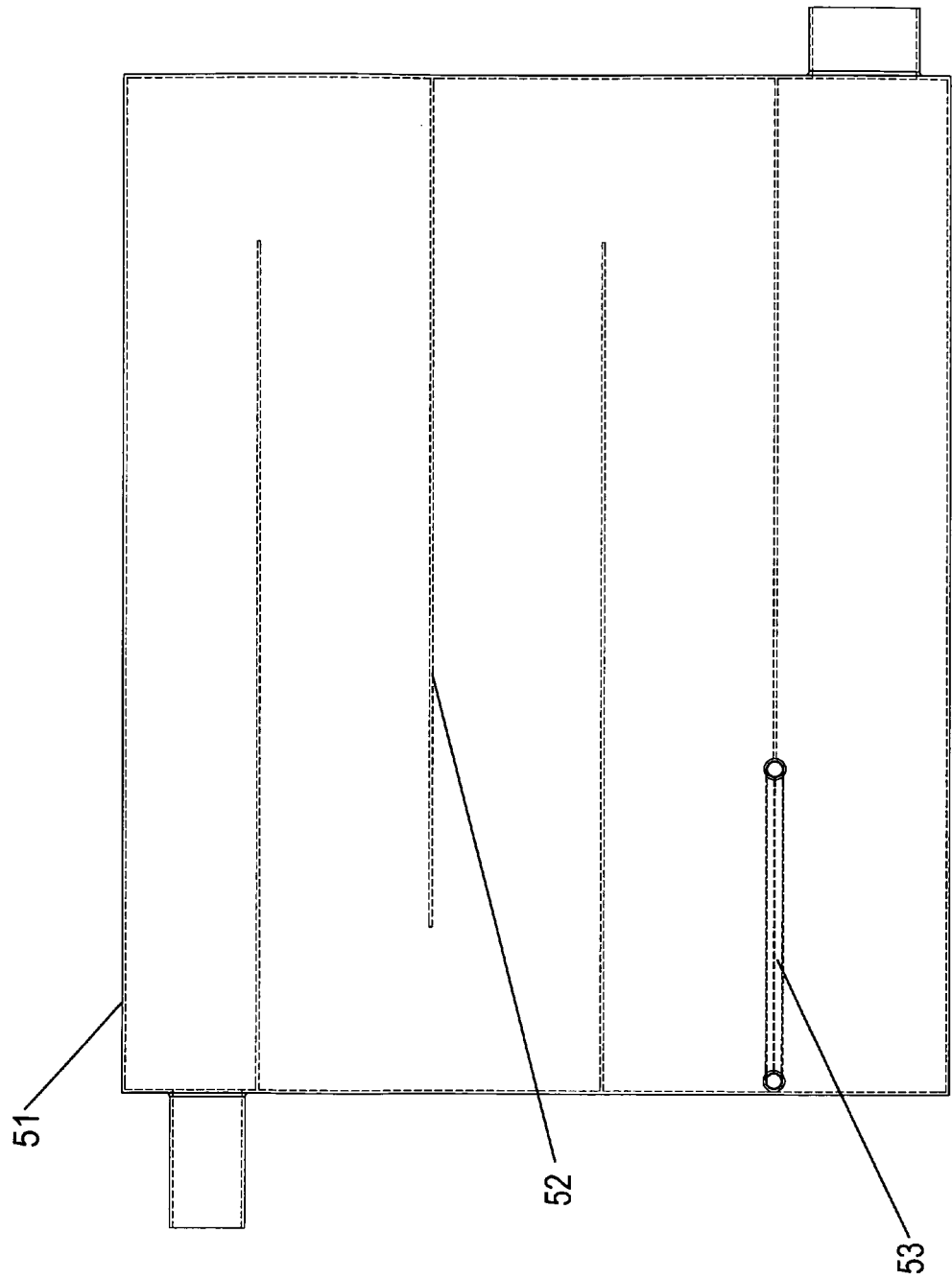

SUSPENSION LIQUID EXTRACTION APPARATUS AND METHOD

This application claims the benefit of U.S. provisional patent application Ser. No. 61/194,999, filed Oct. 2, 2008, titled Suspension Liquid Extraction Apparatus and Method.

BACKGROUND OF THE INVENTION (a) Field of the Invention

The present invention relates to an apparatus for removing liquid from a suspension. More particularly, the present invention relates to a filtration apparatus using vacuum pressure, compressed air and radiant heat to facilitate extraction of water from a suspension and an air flow within the vacuum chamber to remove the evaporate as a cost-efficient and resource-efficient means of filtering and drying solids in large volumes of suspension to remove interstitial and chemically bound liquids, resulting in up to 100% total solids.

(b) Background of the Invention

Mixtures of liquids and solids, known as suspensions, present expensive disposal problems to the industries that generate them. Unprocessed suspensions typically cannot be disposed of in landfills due to regulations on water content. Even with more permissive regulations, it is much more expensive to transport and dispose of unprocessed suspensions than just solid components because transportation charges and landfill charges correspond to weight.

Additionally, the scope of potential uses of such suspensions is often substantially increased by removal of the liquid component from the solid component. Typically, the value of the dry solids arises from the decrease in weight occasioned by the removal of the liquid fraction, which leads to decreased disposal and transportation costs. Additionally, the recovered dried solids may be commercially valuable, such as if they are useable in other industrial and municipal applications (e.g., renewable fuel) or can be sold in secondary markets, such as in the case where the suspensions comprise paper, fiber, coal or mineral slurries.

Unfortunately, efforts to work around the suspension disposal problems often employ methods lacking environmental soundness. For example, many industries dump suspensions, such as waste products, into holding ponds, which are typically large concrete or plastic lined, man-made pools requiring acres of real estate. The suspensions then sit in these holding ponds while the solid materials settle at the bottom over time with the aid of only gravity. Aside from being a slow process, the potential for the pool lining to fail or result in contamination of the surrounding environment makes this a less-than-desirable solution in terms of both efficiency and environmental impact.

Industrial suspension ponds suffer from significant practical difficulties. To begin, holding ponds have a poor resulting yield (dry solid percentage content). Being passive, it also takes a long time to separate water from solids for a given volume of suspension, as compared to devices that rely on active separation. Keeping up with the output for any given suspension flow rate requires a greater area than if active separation systems are used. Two active separation systems, centrifuge processors and belt presses, each produce higher solid content yields than suspension ponds, however, they lack the ability to utilize thermodynamics to achieve 60-100% dry solid percentage yields. These active separation systems are expensive to purchase and operate and are not readily scaled up or down to handle corresponding volumes of industrial suspension flow rates. The lack of portability and limitations on the amount of material which can be processed in a given time are also a significant limiting factor.

Accordingly, a need is identified for fast and efficient methods and devices for actively separating water from a suspension, and also to produce a resulting solid that is sufficiently dry for use in other applications.

SUMMARY OF THE INVENTION

In its broadest aspects, the present invention relates to apparatus and methods for separating liquids from mixtures of liquids and solids that substantially eliminate one or more of the problems arising from the limitations and disadvantages of the prior art. The invention is particularly suited for separating water or other liquids from solids in all types of suspensions, including effluents (mixed water and waste) or slurries. Throughout this application, mixtures of solids and liquids may be referred to as a suspension. This includes any combination of particulate matter (solids) suspended in or containing significant quantities of water or any other liquid. While it is envisioned that the primary use of the invention is to dewater effluents, it is anticipated that the device will be equally useful in any application that requires removal of liquids from any mixture of liquids and solids.

The invention involves providing at least one arced container for receiving and at least temporarily holding the suspension, which may flow from a suspension discharge pipe or other source onto a conveyor belt. The container may comprise a chamber or compartment bounded by an interior curved sidewall having plurality of graduated, arcuate conduits associated with a filter. A cover, such as a substantially airtight, preferably non-permeable pliable membrane, may be placed over the container to form an airtight seal within the container. The container may be further divided into a series of chambers using an apparatus that locks into place once the conveyor belt has moved the suspension into the chamber. The apparatus seals around the conveyor belt to create separate chambers within the container.

Each of the chambers are separated by a container seal constructed from a non-permeable substrate to create a dividing wall seal. The suspension will be transferred directly from one chamber to the next while certain liquid removal processes are performed upon the suspension. Preferably, the suspension will be temporarily stored in each chamber for approximately 6 minutes while the dewatering process is performed. The suspension is moved from the first chamber to the second and subsequently the third chamber using the conveyor belt.

The conveyor belt is supported from below to prevent the conveyor belt from significantly contorting during the drying process. Vacuum conditions reaching 23 inches of mercury (77.9 kPa) pressure within a single 6 foot (1.83 m) by 12 foot (3.66 m) chamber can produce over 114,000 lbs (51.2 metric tons) of force from the non-permeable membrane onto the conveyor belt. The support structure should be created from a material capable of withstanding the force, such as an expanded metal structure or wire mesh which fits under the conveyor belt, and over the conduits. The expanded metal structure or wire mesh is further supported by the series of conduits, preferably metal conduits, attached to the sidewall.

A lid for the container may be constructed of a membrane that may also act as a direct force or pressure on the suspension once a vacuum is applied. A vacuum is applied to the first chamber within the container through the conduits, and the negative pressure causes the liquid component of the suspension to be forced through the filter and the conduits for recovery. The negative pressure created by the vacuum acts upon the pliable non-permeable membrane and pulls the membrane towards the vacuum, which in turn applies positive pressure on the suspension from above, forcing the liquids of the suspension through a filter. To draw liquid from the product in the container, a pressure differential is created across the membrane in each of the chambers to create a squeezing force against the membrane pulled towards the vacuum.

The graduated design of the sidewall and conduits enable even flow rates of liquid passing through the filter media at the upper portion of the apparatus as the lower portion near the drain. This also results in a substantially equal vacuum pressure being applied to the entire surface area of the filter below the suspension and to the pliable, non-permeable membrane above the suspension and enables captured (filtered) solids in the suspension to be evenly dispersed across the filter media. The pliable cover acts to absorb the bulk of all vacuum pressure. By doing so, the entire force, over time, of the vacuum is applied to the suspension during the drying process by the pliable membrane. This force creates a negative pressure or vacuum chamber in which water evaporates at lower temperatures. With the additional application of external heat to the chamber, the apparatus can further reduce the water content of the suspension efficiently.

The liquid removal process may occur over multiple chambers to achieve the desired level of dryness for the solid component of the product in the container. Additionally, heat may be employed to speed the separation process, and the product may also be mixed or agitated for this reason. Heated compressed air injection, radiant heat, pressure, microwaves and vacuum can be employed to remove the liquid component from the solid component of the product or suspension in a rapid fashion. Sensors and automatic release valves may be used to ensure that the internal vacuum pressure does not reach an unacceptably high level.

The first chamber of the invention may be used to separate liquids from solids in suspensions with greater than 95% liquid content. To increase the efficiency of the first chamber in removing the majority of moisture, a sealed, rigid cap may be placed over the pliable membrane. When vacuum is applied to the suspension, the vacuum force may be partially absorbed by solids captured by the filter. In this case, the force of the vacuum may take longer to reach the pliable membrane above the suspension. The application of a rigid cap above the pliable membrane enables pressure to be added to the pliable membrane from above with little expenditure of energy. The pressure from the cap aids the pliable membrane in pressing the suspension and allowing for the pressing action once the vacuum locks onto the membrane. Thus the pressure from the cap and from the vacuum work in concert to squeeze the liquid from the suspension. For example, in a vacuum of 23 inches of mercury or 11.3 pounds per square inch ("psi") (77.9 kPa) and a pressure from the cap of 6 psi (41.4 kPa), a total of 17.3 psi (119.3 kPa) would be applied to the suspension. In a chamber 6 feet (1.83 m) wide and 12 feet (3.66 m) long, a force of 17.3 psi (119.3 kPa) would create a pressing force on the suspension of 179,366 lbs (81.4 metric tons).

In a second and third chamber, a vacuum is applied in conjunction with one or more of compressed and heated air injection, heat and/or a microwave. Similar to the first chamber, the second and third chambers include graduated sidewalls having conduits to collect liquids being removed from the suspension. In these chambers, the injection of compressed and heated air into the vacuum chamber is for the vaporization and removal of water. The compressed and heated air is injected into a chamber that consists of at least one wall constructed of a non-permeable membrane. When the compressed and heated air is introduced into the chamber under vacuum, the air expands and/or increases in flow rate from its compressed state, such as, for example, 100 psi (689 kPa) through atmospheric pressure and into an expanded state, such as, for example, 23 inches of mercury (77.9 kPa) vacuum pressure.

The second and additional chambers contain the filter and the conduit design of the first chamber. The vacuum and compressed and heated air of the second and additional chambers provide for the separation of the liquid from the solids of the suspension by providing for an efficient evaporation of interstitial and chemically bound liquids combined with a filter which allows for the liquids and vapor to pass, but prevents the solids of the suspension composition from passing there through. As the liquids and vapor pass through the filter, they are collected into the conduits and stored separately.

The primary benefit of the vacuum is that, at 23 inches of mercury (77.9 kPa) pressure, it reduces the boiling point to 146° F. (63.3° C.). Radiant heat, microwave radiation, and compressed heated air is applied to the suspension to heat the suspension to the boiling point. Compressed air provides for a lower flow rate of air to heat a larger area of the suspension. As the compressed air expands through atmospheric pressure, the heated air disperses to heat a wider area. The compressed air is continually injected from above. As the suspension begins to boil from the heat acting upon the reduced boiling point, the compressed air forces the water vapors through a filter and into the conduits to remove the liquids and vapors from the suspension. Microwave and radiant heat expedite the process.

Twenty-three (23) inches of mercury (77.9 kPa) pressure represents the vacuum pressure at which the least amount of heat or latent heat required to create vapors from the boiling water within the suspension. Beyond 23 inches of mercury (77.9 kPa) pressure, a greater amount of heat is required to create the vapors. The present invention creates for a most efficient means of removing water from a suspension.

Thermodynamics analysis of the apparatus demonstrates the benefits of both reduced boiling points and the utilization of compressed, heated air and radiant heat for the vaporization and removal of interstitial and chemically bound liquids. The preferred embodiment uses compressed heated air at a minimal injection temperature of about 300° F. (148.9° C.) and an injection rate of approximately 900 standard cubic feet per hour ("SCFH") (25.5 cubic meters per hour at conditions 15.56° C. and 101.325 kPa) at 100 psi (689 kPa) per 10 square feet (0.93 $m^2$) of filter surface area to increase the capacity of the system. The air is continuously injected into the suspension and rapidly removed with water and vapor by the vacuum. Heat is simultaneously added through radiant heaters. Additional volumes of heated air injection and additional radiant or microwave heat may be used to reduce the processing (or drying) time of the suspension).

A 1$^{st}$ Law of Thermodynamics model of the system can be written:

$$m_{air}\cdot h_{air}+m_{water}\cdot h_{water}+m_{solids}\cdot h_{solids}+Q_{heat}=m_{air}\cdot h_{air}+m_{water}\cdot h_{water}+m_{solids}\cdot h_{solids}$$

On the left side of the equal sign, the incoming energy of the three streams (water, entrained solids and heated air) is calculated using the respective mass times inlet enthalpies (h) and the radiate heat term is Q (4 kW times the duration of heating). On the right side of the equal sign the resulting energy of the system is determined by the various masses times the enthalpies at boiling temperature. Using the apparatus' performed testing conditions (masses of various components, air flow rates and temperatures), the 4 to 5 minutes that it takes to boil at about 146° F. (63.3° C.) and remove liquids is consistent with the equation above. The energy effect of the heated air and the energy provided by the radiant heaters efficiently promotes vaporization in the vacuum conditions at about 19-23 inches of mercury (64.3-77.9 kPa) vacuum of the chambers. The following table shows the temperature increase for heated air and radiant heat. Use of microwave radiation further improves both time to boiling point and energy efficiency of the apparatus.

| Energy Source | Inlet Temperature | Exit Temperature |
|---|---|---|
| Both air and radiant heat | 77° F. (25.0° C.) | 158° F. (70.0° C.) |

In addition to the action of heated compressed air to transition interstitial and chemically bound water to vapor, the flow rate of the air as it enters the vacuum chamber also acts to remove moisture by force. The movement of air through the suspension increases in flow rate due to changes in pressure. Consequently, the movement of air through the suspension acts to carry or transport the moisture through the filter for removal. This flow-through drying process, in combination with the heat transitioning remaining moisture to vapor for removal, offers a very efficient means of drying a suspension.

Once the solid component of the product in the container reaches a sufficient level of dryness, the membrane may be lifted or removed from the chamber. The dewatered or dried product should consist substantially of the solid component of the product, and may be removed from the container by rotating the conveyor belt to rotate the solids into a solids receptacle. Alternatively, an upper portion of the chamber may include a vacuum for drawing dried material from the lower portion of the chamber for recovery, or by lifting the filter and any support structure and physically removing the solids. In either case, once the recovery step is complete, the container is then once again ready to receive suspension. The removed product may then be subjected to further drying, if necessary for the proposed use.

The present invention is capable of significantly outperforming current drying methods in the industry. Testing has revealed that post-processed sludge yield from the industry that undergoes a single 6 minute process of the present invention is reduced in weight by over 42% as a result from additional drying and the total solids is increased from about 19-20% to about 69%, and that an increase to two 6 minute cycles increases the total solids to about 75-80%. The present invention is capable of being scaled to process small quantities of suspension as well as quantities significantly greater than that which may be processed by the prior art.

In one embodiment, the present invention comprises a container including a first chamber, the first chamber including at least one drain and a filter, a lid capable of sealing the first chamber, the lid comprising a rigid frame supporting a pliable membrane, means for creating a vacuum in the first chamber through the at least one drain, wherein the filter is located between the pliable membrane and the at least one drain, and whereby a vacuum created by the means for creating a vacuum applies negative pressure to a suspension located between the pliable membrane and the filter, such that the negative pressure forces liquid components of the suspension through the filter and applies negative pressure to the pliable membrane, such that the pliable membrane can exert positive pressure against the suspension located between the pliable membrane and the filter, such that the positive pressure forces liquid components of the suspension through the filter. In this embodiment, the present invention may further comprise a second chamber including at least one drain and a filter, a lid capable of sealing the second chamber, the lid comprising a rigid frame supporting a pliable membrane, wherein the filter is located between the pliable membrane and the at least one drain; and whereby the second chamber is serially linked to the first chamber. In this embodiment, the second chamber may include a plurality of inlets, whereby an airflow of heated compressed air enters the second chamber via the plurality of inlets, at least a portion of the airflow passes through a suspension, and the airflow exits the second chamber via the at least one drain.

In another embodiment, the present invention comprises a curved container, the container comprising at least one drain and a filter restricting the access of solids to the at least one drain, a lid, the lid comprising a rigid frame, a pliable membrane supported by the rigid frame, and a plurality of inlets, whereby an airflow of heated compressed air enters the container via the plurality of inlets, at least a portion of the airflow passes through a suspension, and the airflow exits the container via the at least one drain, a sealing mechanism capable of sealing the container and dividing the container into one or more chambers, a conveyor belt capable transporting a suspension serially through each of the one or more chambers and out of the container, and means of creating a vacuum, the means in fluid communication with the at least one drain, whereby a vacuum created by the means for creating a vacuum applies negative pressure to a suspension transported on the conveyor belt, such that the negative pressure forces liquid components of the suspension through the filter; and applies negative pressure to the pliable membrane, such that the pliable membrane can exert positive pressure against the suspension transported on the conveyor belt, such that the positive pressure forces liquid components of the suspension through the filter, and whereby heat from the airflow of heated compressed air and decreased pressure from the vacuum can transition liquid components of a suspension into vapor phase and expansion of the airflow of heated compressed air can transport the vapor out of the container via the at least one drain.

In a further embodiment, the present invention comprises the method of extracting liquid from a suspension, namely (a) transporting a suspension into a first chamber, the first chamber including a filter restricting access to a drain, (b) sealing the first chamber with a lid, the lid including a pliable membrane contacting the suspension, and (c) applying a vacuum to the first chamber via the drain, whereby the vacuum applies negative pressure to the suspension, such that the negative pressure forces liquid components of the suspension through the filter, and the vacuum applies negative pressure to the pliable membrane, such that the pliable membrane exerts positive pressure against the suspension, such that the positive pressure forces liquid components of the suspension through the filter. This embodiment may further include the additional step (d) applying a rigid cap to the pliable membrane on a side opposite the suspension, the rigid cap exerting pressure on the pliable membrane such that the pressure exerted by the pliable membrane against the suspension is increased. Alternatively, this embodiment may include the additional steps (d) unsealing the first chamber, (e) transporting the suspension into a second chamber, the second chamber including a filter restricting access to a drain, (f) sealing the second chamber with a lid, the lid including a pliable membrane contacting the suspension, (g) applying a vacuum to the second chamber via the drain, whereby the vacuum applies negative pressure to the suspension, such that the negative pressure forces liquid components of the suspension through the filter and applies negative pressure to the pliable membrane, such that the pliable membrane exerts positive pressure against the suspension, such that the positive pressure forces liquid components of the suspension through the filter, and (h) applying an airflow of heated compressed air to the suspension, whereby at least a portion of the airflow passes through the suspension such that heat from the airflow and decreased pressure from the vacuum transitions liquid components of the suspension into vapor phase and expansion of the airflow transports the vapor out of the second chamber via the at least one drain.

BRIEF DESCRIPTION OF THE DRAWINGS

A better understanding of the present invention may be had upon reference to the following description in conjunction with the accompanying drawings, wherein:

FIG. 2(a)-2(b) show embodiments of the conduits of the container;

DETAILED DESCRIPTION OF THE INVENTION

Figure 1A:
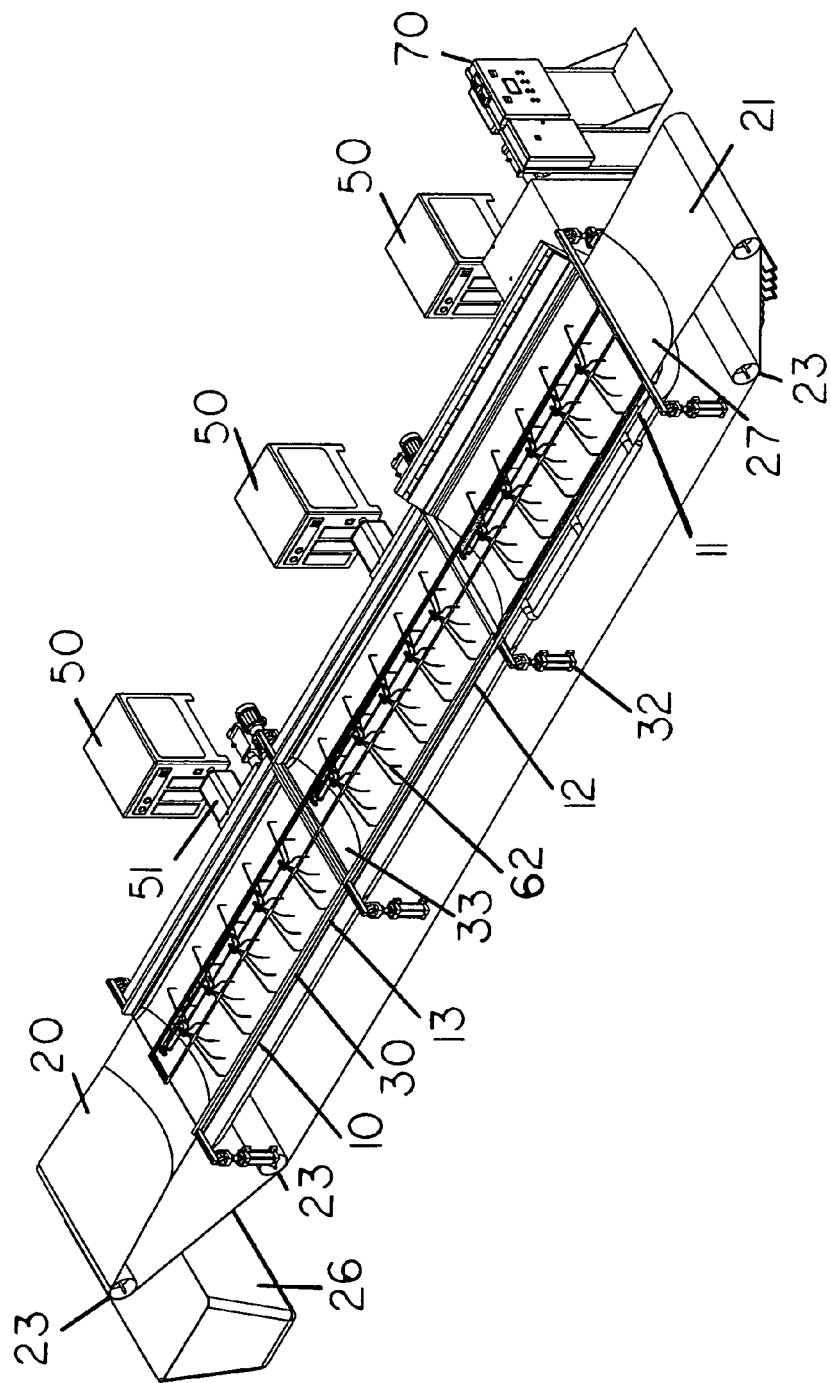
FIG. 1(a)-1(c) show an embodiment of the suspension liquid extraction apparatus.
Figure 1B:
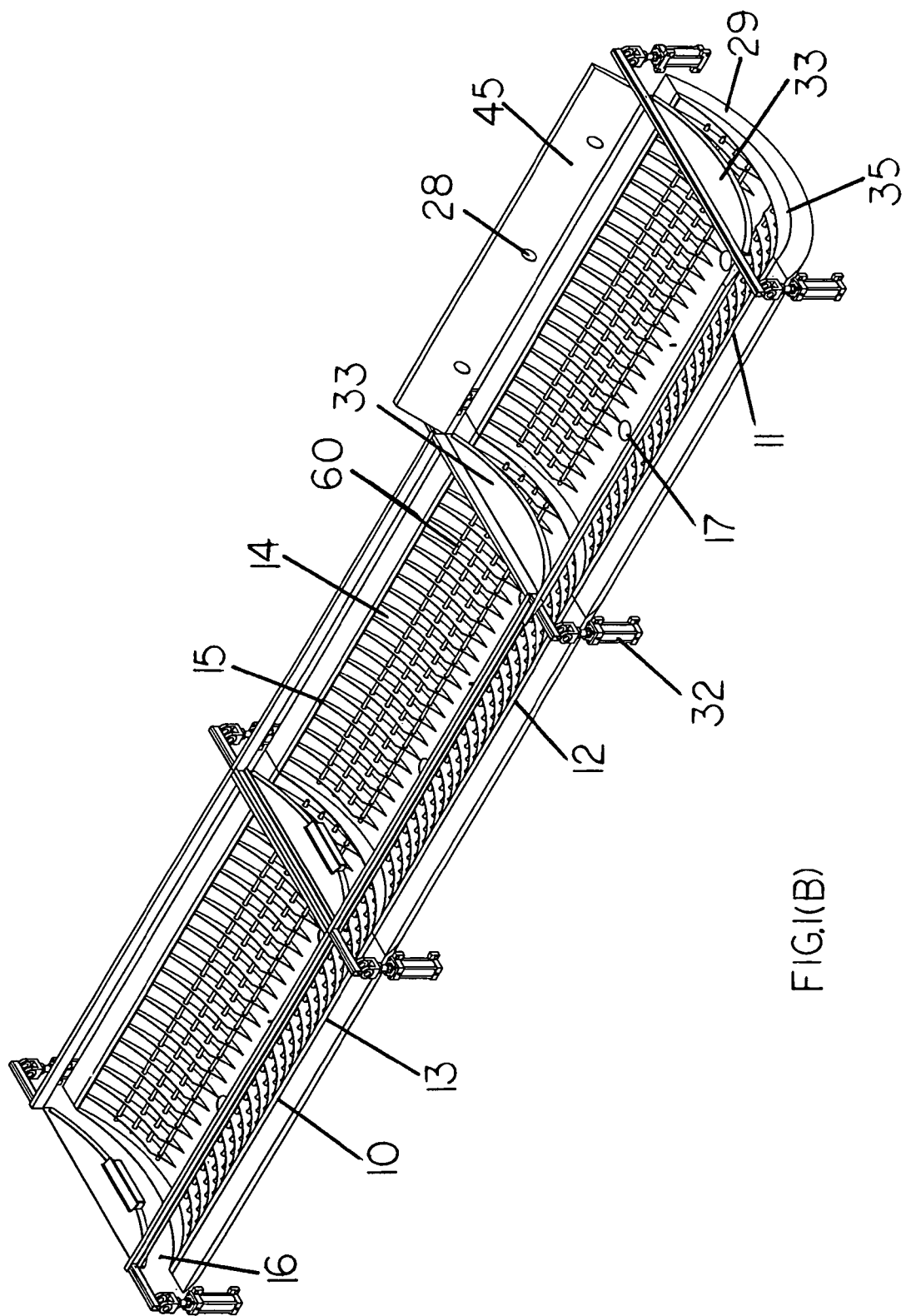
Figure 1:
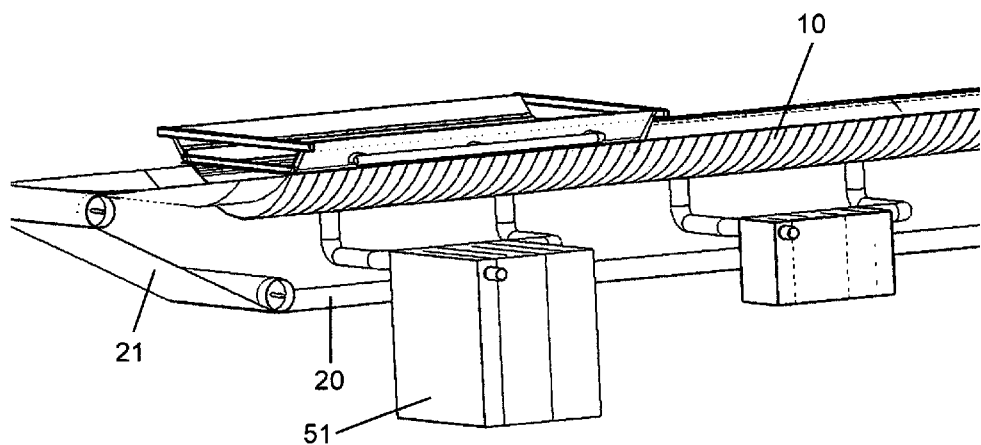

FIG. 1(a)-(c) depict one aspect of the invention, which includes a low profile, relatively compact and horizontal container 10, preferably arced or curved in shape, which may be further subdivided into serially linked chambers 11-13 for use at an industrial or municipal site that produces a suspension, such as, for example, a waste product or a mixture of liquids and solids. Although preferably arced, other designs may be readily apparent to those skilled in the art, such as, for example, a flat container. In a preferred embodiment, the container 10 is subdivided into three chambers 11-13. The container 10 may be buried in the ground or, alternatively, may be above ground and associated with a suitable frame, if necessary, to ensure stability. Still another option is to associate the container 10 with a vehicle, such as a flatbed truck or trailer, such that it may be easily transported from one site to another and thus becomes portable.

As noted above, the container 10 is preferably arc-shaped or curved in cross-section. The container 10 has a top opening 16. The preferred embodiment of the arc design is that of a container 10 of a length of about 36 feet (11.0 m), a depth of about six inches (15 cm) and a width of about 6 feet (1.83 m).

The container 10 can be made of any suitably strong material resistant to leaking and to reaction with the corresponding product. Examples of materials from which the container 10 may be constructed include concrete, plastic, steel, or other metal, with a preference for aluminum, carbon steel or stainless steel (primarily due to the superior corrosion resistance afforded). Specifically, the container 10 may comprise prefabricated components of a size that permits easy transport to the industrial site. The components may then be assembled at the industrial or municipal site in whole or in part.

The preferred embodiment of the present invention has three chambers 11-13, although the chambers can be combined in number and type as desired for the particular suspensions. This arrangement has the benefit of providing for a series of dewatering processes, thus allowing separation of finer particles in sequential processing applications and dewatering captured solids to levels approaching 100% total solids, as will be explained in further detail below.

The container 10 includes a curved inner sidewall 14 having a plurality of conduits 15 formed therein. Preferably, the conduits 15 are generally arcuate, spaced apart grooves formed in the sidewall 14 that, in view of the arced nature, converge towards the bottom central region of the container 10. Preferably, with reference to FIG. 2(a), the conduits 15(a) form a parallel pattern around each vacuum 50. However, a radial design may be used as well. At the center of the bottom of the chamber, at least one drain 17 is located through which a vacuum 50 is pulled.

Most preferably, the conduits 15(a) are formed having a parallel fin design such that they are generally curved in cross-section and are separated by about 6 inches (15.24 cm). The fin design extends from the upper end or top of the sidewall 14 continuously to a point near the bottom of the chamber, providing sufficient room for flow from each conduit to the at least one drain 17. In an alternative embodiment, as seen in FIG. 2(b), the conduits 15(b) create a radial design, the conduits 15(b) taper from a wider dimension adjacent an upper end or top of the sidewall 14 (e.g., 10 inches or 25.4 cm) to a narrower width dimension (e.g., 2 inches or 5.1 cm) adjacent the bottom, such as, for example, near the center. Also, as perhaps best understood with reference to FIG. 3, the conduits preferably have a depth relative to the inner surface of the wall 14 adjacent the top of the container 10 that is infinitely small, such as, for example, approaching zero inches (0 cm), and increase to a greater depth, such as, for example, 6 inches (15.24 cm), adjacent the bottom. In any case, the conduits 15 serve to direct any fluid (water) from the suspension in the container 10 to an outlet or drain 17 formed at or near the bottom center of the sidewall 14 for recovery.

Figure 3:
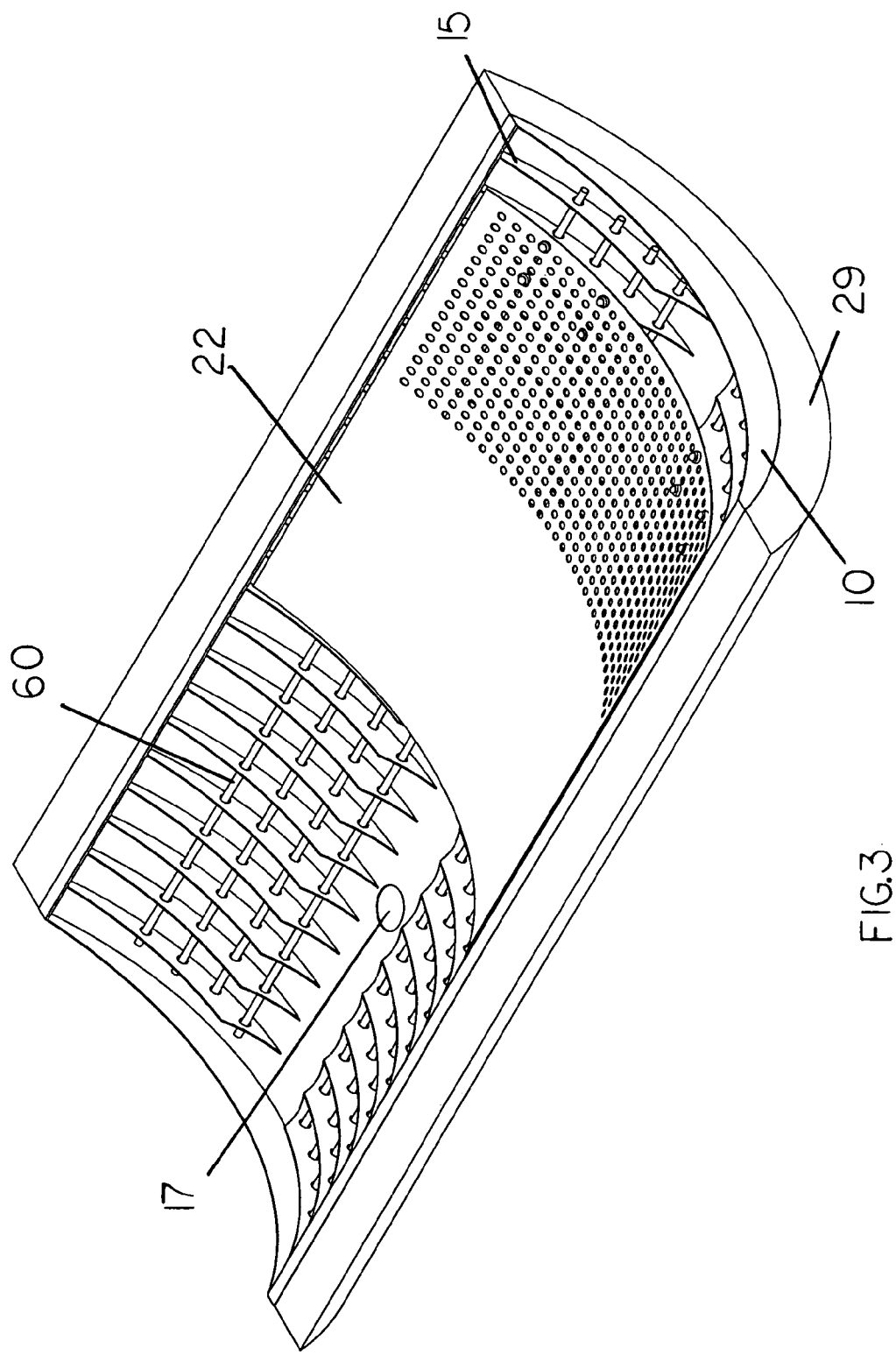
FIG. 3 shows the interior of an individual chamber with the support structure partially removed.

As can be understood viewing FIG. 3, a support structure 22, such as, for example, expanded metal or wire mesh, overlies and separates the conduits 15 from the conveyor in the chamber, and preferably also covers the opening or drain 17 through which a vacuum 50 is drawn and the liquid or vapor is recovered. This support structure 22 may be arced in shape and simply placed in the chamber 11-13 below the conveyor belt 20 and filter 21 material, or instead may comprise individual inserts for the container 10 that engage or overlie the conduits 15 below the conveyor 20 and filter 21 material. The support structure 22 should be capable of withstanding extreme force, such as, for example, in excess of 17.3 psi (119.3 kPa) at 23 inches mercury (77.9 kPa) vacuum, which equates to 179,366 lbs (81.4 metric tons) of force over a 6 foot (1.83 m) by 12 foot (3.66 m) chamber 11-13. The support structure 22 should not disable the movement of the conveyor belt 20 between chambers 11-13, mentioned below, nor impede the suction effect created by the vacuum 50. The support system may be supplemented with internal rollers (not shown) capable of providing support as well as facilitating movement of the conveyor belt 20. In one embodiment, the support system may consist entirely of a series of rollers (not shown). Additionally, it is important that the material should allow for the flow of air and water and be resistant to corrosion. The underlying conduits 15 may also be coated with an inert material, such as TEFLON®, to reduce corrosion on the surface and to increase flow rates.

Figure 4:
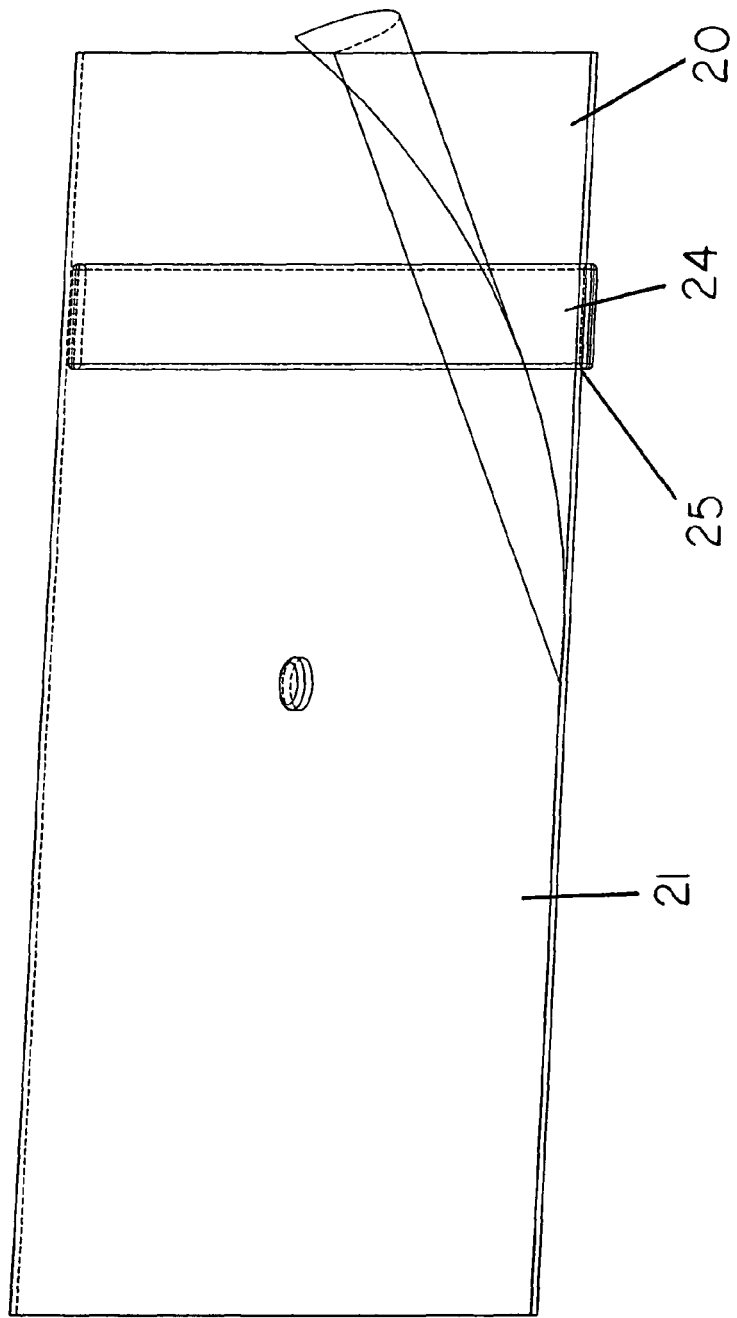
FIG. 4 shows a conveyor belt and filter.

In a preferred embodiment of the present invention, the container 10 is connected by a system capable of transferring the suspension contents into the first chamber 11, from chamber 11 to chambers 12-13, and out of chamber 13. In a preferred embodiment, with reference to FIG. 1(a) and FIG. 4, the system is provided by an internal conveyor system 20 such as, for example, a conveyor belt, capable of transporting the solid suspension contents thereto. The conveyor belt 20 of the present invention may be made out of any material capable of withstanding the heat and pressure created within the chamber 11-13 without significantly stretching, warping, tearing or being otherwise rendered useless. The conveyor belt 20 of the present invention should be semi-permeable, such as, for example, any perforated or porous material, such as, for example, a porous KEVLAR® mesh or a stainless steel mesh or twill, allowing liquids and gases to pass there through, while restricting and retaining solids.

The conveyor belt 20 is preferably a loop design of a length of approximately 80 feet (24.4 m) and a width of approximately 6 feet (1.83 m) rotating along at least two, but preferably four or more mechanical rollers 23. At least two of the rollers 23 should be located outside of the container 10. The loop of the present invention passes through the container 10 around rollers 23 and under the container 10 to create the loop. The rollers 23 of the present invention must be capable of moving the filter 21, conveyor belt 20 and suspension, which may weigh 800 lbs (363 kg) or more, without slipping. A guide 27 may be placed along the sides and above the conveyor belt 20 as the belt enters the first chamber 11. The guide 27 will serve to prevent the suspension from traveling around the filter 21 and will assist as the suspension is transported between the chambers 11-13.

A filter 21 is provided which should be constructed of any material suitable for blocking solid particulate matter from a suspension, thus holding the solid particulate matter in place, but that allows liquid and vapor from the suspension to pass through. The filter 21 comprises a sheet of selectively porous material, such as a synthetic polymer-based fabric in the form of a woven geotextile or a stainless steel mesh or twill. Of course, an important consideration when selecting a filter 21 for use with this invention is the size of the solid particulate matter in the suspension to be separated. Finer solid particulate matter would require a finer mesh in order to prevent the solid particulate matter from passing through the filter 21 with the water and vapor. The most preferred embodiment allows for micron-based filtration and may vary from 5 micrometers to 120 micrometers, depending upon the size of the solid particulate matter.

In a most preferred embodiment, the conveyor belt 20 of the preferred embodiment operates as a filter 21 for the suspension. Alternatively, the conveyor and filter 21 may be separate layers. In this alternative embodiment, the filter 21 is transported by the conveyor belt 20. The filter 21 is tightly wrapped over a conveyor system and will provide the support necessary to transport the suspension, but is pliable enough to give a slight bend to provide a cupping aspect. In a preferred embodiment, the filter 21 and the conveyor belt 20 may be attached by adhesion 25, riveting or welding near the edges and/or along the centerline of the conveyor belt 20 and filter 21.

Suspension to be dewatered may be loaded onto the conveyor belt 20 in multiple ways. In a preferred embodiment, the suspension may be loaded directly onto the conveyor belt 20 into the first chamber. In this embodiment, suspension may be loaded using a pump (not shown) with inlets 28 located between the filter 21 and a lid 30, described in further detail below. In an alternative method, suspension may be poured directly into the chamber 11-13 from above through the top opening 16 between the filter 21 and the membrane 31 prior to the opening 16 being sealed by lid 30. In an alternative embodiment, suspension is loaded directly onto the conveyor belt 20 prior to the first chamber. The conveyor belt 20 then rotates to transfer the suspension into the first chamber. In either of the first two embodiments, a splashguard 45 should be provided at the loading point, particularly in the event of primarily aqueous solutions.

If the container 10 is subdivided into multiple chambers 11-13, the suspension of chamber 11-13, ranging from about 60% to about 99% water, may be continuously pumped into the first chamber 11 using the inlets 28 between the lid 30 and the filter 21 during the straining process. In this embodiment, a fill rim 45 may be added to the top of the chamber 11 to extend the height of the first chamber 11. Filling inlets 28 should be placed along the fill rim, which provides an inlet through which to pump suspension into the chamber. The suspension may be pumped into the chamber continuously or intermittently depending upon the rate the liquid or vapor of the suspension drains under vacuum 50. The suspension is pumped in below the membrane 31, which acts as a force from above pushing the liquids through the filter 21. The vacuum 50 is continuously applied during the straining process to extract the maximum amount of liquid and vapor from the suspension. Higher flow rates through the inlets 28 enable less vacuum pressure from the membrane and enable even disbursement of captured solids by the filter 21. Lower flow rates enable greater pressure to be generated by the non-permeable membrane and increases the rate of removed liquids through the filter. Preferably, a sensor is located within the fill rim. The sensor of the present invention may provide readings on the height level of the suspension within the chamber 11 to guard against overflow. As the suspension rises towards the top opening 16 or fill rim, the sensor can send a signal to the control system 70 to shut off the fill pump.

In one embodiment, a polymer may be added to the suspension prior to the suspension being placed into the chamber 11 to increase the particulate size of suspended solids so that they may be more easily captured during the filtration process. The electron field created by the charge of certain chemical compositions may create a lattice-like structure within the suspension as like-charged particles magnetically repel one another. The polymer of the present invention should have a chemical composition wherein the charge is opposite of that of the charge of the liquids within the suspension, causing the molecules to bond and coagulate. By promoting coagulation, the liquids and vapors may be more easily pulled through the at least one drain 17 and solids captured by the filter 21.

The suspension is moved between chambers 11-13 along the conveyor belt 20. Once the conveyor belt 20 moves the suspension into one of the chambers 11-13, the conveyor belt 20 stops to allow the process of dewatering the suspension. The conveyor belt 20 may be automated or it may be controlled manually. Preferably, the conveyor belt 20 will deposit the suspension within the chambers 11-13 for approximately 2-6 minutes to allow for a single cycle of the dewatering process to be performed to the suspension while in the chambers 11-13.

Once the conveyor belt 20 has positioned the suspension within the chambers 11-13, the chambers 11-13 are sealed. The present invention involves the use of a vacuum 50, thus the chambers 11-13 must be adequately sealed to allow for a sufficient decrease in the gaseous pressure at a point significantly below atmospheric pressure. The container 10 as well as the current chamber 11-13 is sealed once the conveyor belt 20 has moved the contents of the suspension into the chamber 11-13. The container 10 and chamber 11-13 of the present invention may be sealed automatically or manually.

The top portion of the container 10 is sealed using a lid 30 design which clamps onto the container 10 using a lock or force. Preferably, the lid 30 is located directly above the container 10 and parallel to the opening thereto. The lid 30 of the preferred embodiment clamps evenly to the container 10 by being lowered into a clamping position. In an alternative embodiment, the lid 30 may include a clamshell design wherein one edge of the lid 30 is physically connected to the container 10 at all times, and rotates those disconnected edges downwards into a clamping position onto the container 10.

Figure 8:
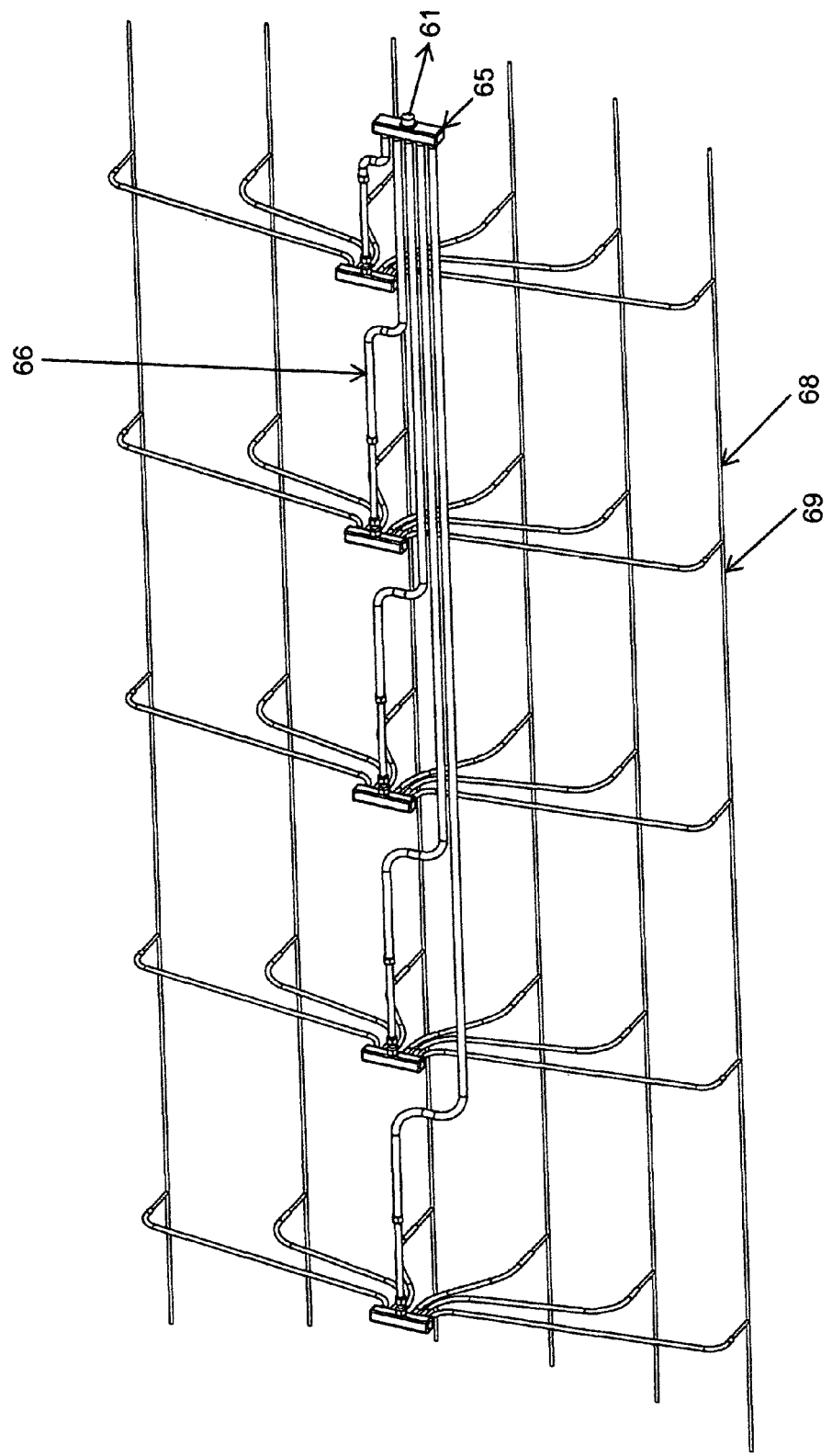
FIG. 8(a)-8(c) show embodiments of the lid.
Figure 8:
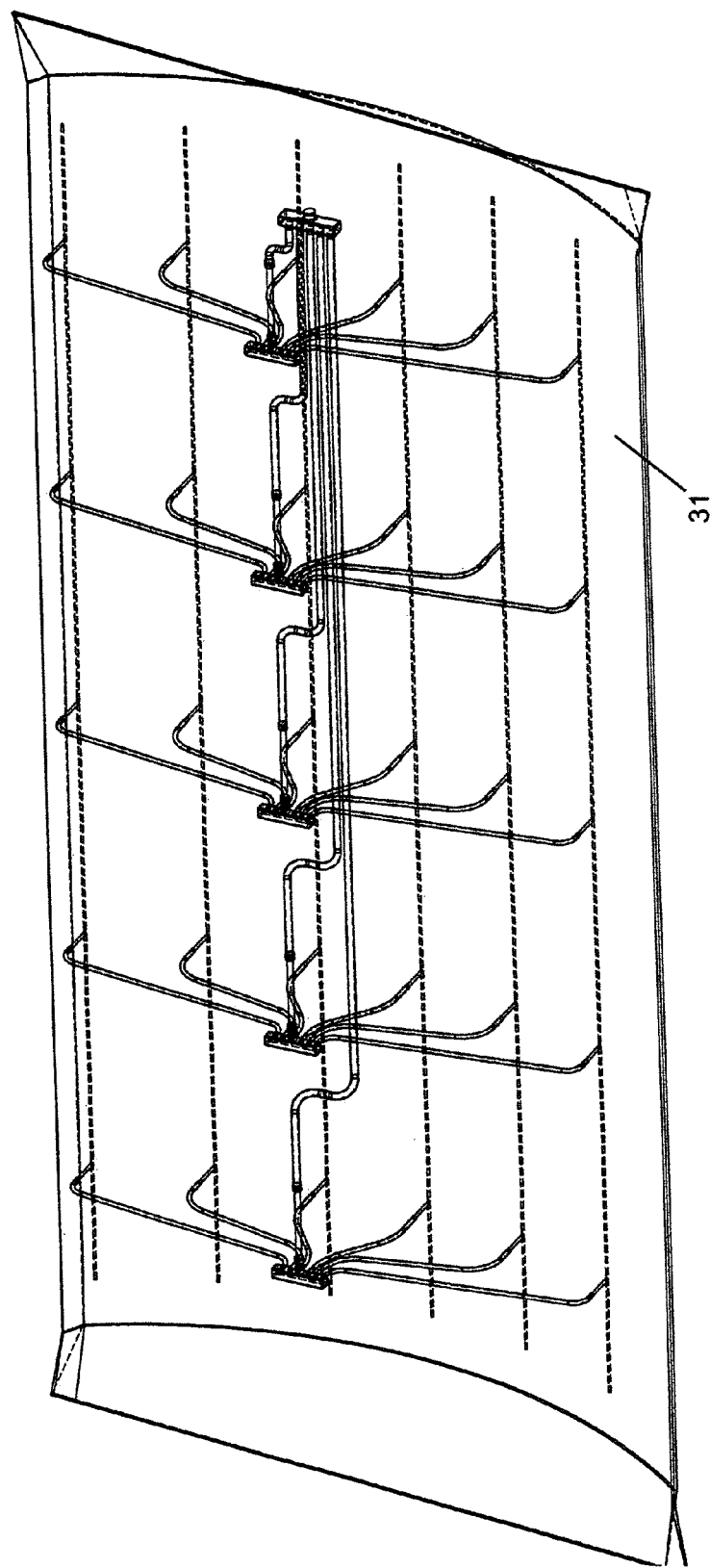

The lid 30 of the present invention should be constructed of a rigid rim structure 72 supporting a pliable membrane 31 non-permeable to air and water, such as, for example, fiberglass-reinforced silicon, as shown in FIG. 8(*a*). The membrane 31 must be capable of withstanding extreme temperatures, such as, for example, in excess of 400° F. (204° C.). Further, the membrane 31 must be pliable to apply pressure to the suspension during the drying process and be easily pulled and compressed. Additional silicon or rubber gaskets 34 and seals near the edges of the container 10 may assist in reliability and sustainability. Air hoses 62 and other components, such as, for example, microwave emitters and air inlets, may pass through the lid 30, provided they are adequately sealed, using, for example, a gasket. Any components passing through the lid 30 should be sealed and reinforced to allow for stress and not to impede the function of the vacuum 50 or air compressor 61. In a preferred embodiment, components passing through the lid 30 avoid puncturing the pliable membrane 31 by passing through the rigid lid rim structure 72.

The rigid rim structure 72 of the lid 30 allows for the lid 30 to be lifted between process cycles to permit the conveyor belt 20 to transport the suspension between chambers 11-13. The rigid rim 72 provides structural integrity to lift and lower the lid 30 without breaking the lid 30 or tearing the membrane 31. The lid 30 should be lifted and lowered by a mechanical, electrical, pneumatic, or preferably hydraulic 32 mechanism. The lid 30 may be lifted and lowered using an external apparatus or the mechanism may be self-contained, such as, for example, internal accordion-style hydraulics 32.

Preferably, both the container 10 and the lid 30 will have their edges lined in silicon at the points of contact. Once the lid 30 is lowered onto the container 10 and the silicon, a secondary seal, such as a latch, may reinforce the seal. Additional means to ensure a tight seal may be employed, such as, for example, creating an accordion-style connection between the lid 30 and the container 10.

Figure 5:
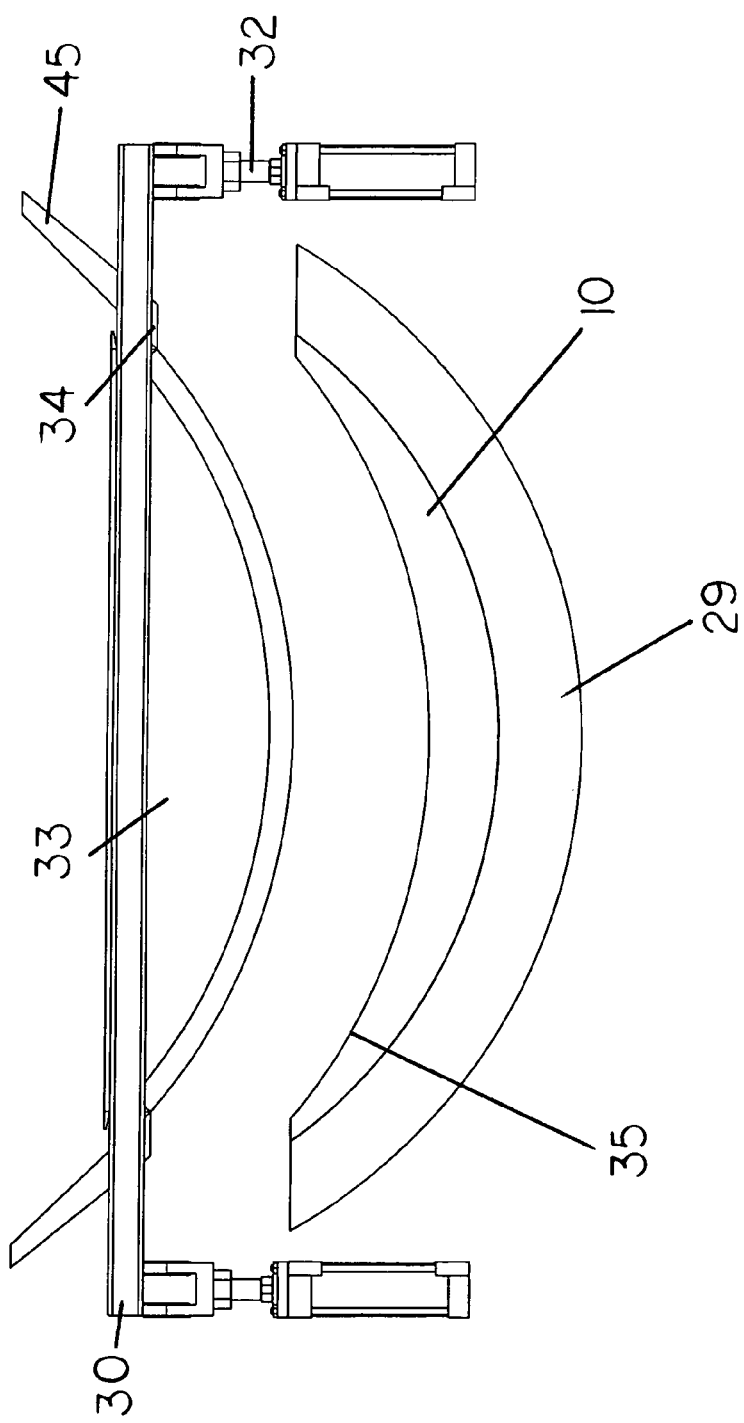
FIG. 5 shows an end view of an embodiment of the suspension liquid extraction apparatus.

In a preferred embodiment, the container 10 including the suspension is subdivided into a series of chambers 11-13, each of which are completely sealed during use. As can be understood with reference to FIG. 5, a seal may be accomplished using a sealing mechanism 33 between chambers and the open ends of the container, namely a sheet of material, such as a rigid wall or seal 33 to create a substantially airtight seal with the open end of the container 10. In a preferred embodiment, the wall or seal 33 is a removable, non-permeable wall or seal, such as, for example, stainless steel, provided that the material is lined along the perimeter in a material such as, for example, reinforced silicon, natural or synthetic rubber, neoprene, or like rubber substances, capable of making a tight seal when combined with a second source of like silicon or rubber substance.

The seal 33 between the distinct chambers 11-13 and open ends of the containers is preferably removeably attached to the lid 30. The seal 33 in this embodiment is preferably rigid, having dimensions matching the dimensions of the inner circumference of the preferably arced chamber. As the lid 30 is lowered to create a seal for the entire container 10, additional seals 33 are created for each chamber 11-13 within the container 10. To facilitate a tight seal 33 as the lid 30 lowers the seal components into place, the container 10 provides a receiver 35, such as, for example, a groove lined in silicon, a silicon strip or gasket, within the chamber 11-13 along the points of contact with the seal.

The sealing mechanism 33 clamps the conveyor belt 20 once the conveyor belt 20 has moved into position into the chamber. Due to the importance of a vacuum 50 in connection with the present invention, a tight seal is required in each chamber 11-13 to maximize the effect of the vacuum 50. If the integrity of the seal is compromised, the time and energy needed to create a vacuum 50 within the multiple chambers 11-13 would be significantly increased and cooler air would be introduced into the chamber, further decreasing efficiency. The conveyor belt 20 preferably includes an intermittent silicon strip 24 which corresponds to the number of chambers 11-13 within the container 10. The silicon strip 24 of the conveyor belt 20 is aligned with the silicon strip 24 or groove within the container 10. The silicon strip 24 of the present invention would be the same width as the conveyor belt 20. To create a tight seal 33 using the silicon strip 24, it is important that the strip be located directly between the sealing mechanism 33 and the receiver 35 on each run. As the lid 30 lowers to create a seal 33 between the chambers 11-13 and at the open ends of the containers 11-13, the seal compresses the conveyor belt 20 from above, applying force through the filter 21 onto the conveyor belt 20 at the point of the silicon strip 24 of the conveyor belt 20 and onto the receiver 35 within the container 10.

Figure 6:
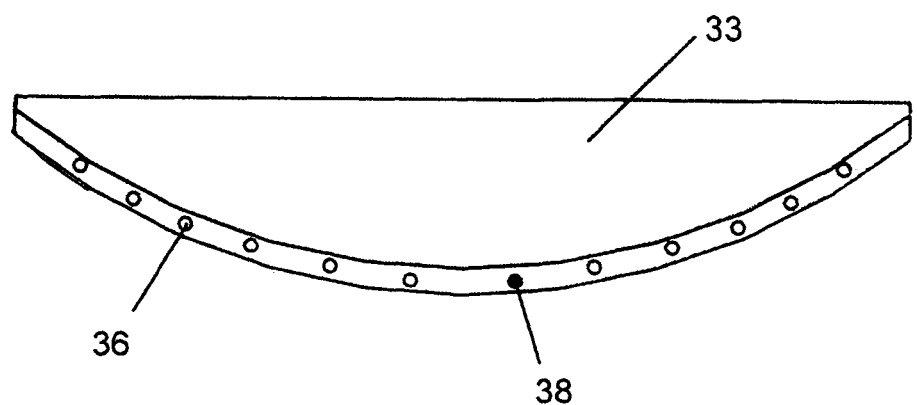
FIG. 6 shows a view of a sealing mechanism.

To facilitate a tight connection between each chamber, air jets 36 as seen in FIG. 6 or brushes may be provided at the beginning and end of each chamber. The air jets 36 blow compressed air provided for by the air compressor 61 at the point of contact between the sealing mechanism 33, the silicon strip 24 of the conveyor belt 20 and the receiver 35 to clear any residue suspension which may impair the function of the vacuum 50 by compromising the integrity of the seal between chambers 11-13. Once the air jets 36 have removed sufficient residue from the contact points of the sealing mechanism 33, the sealing mechanism 33 locks into place. The air jets 36 of the present invention are preferably located along the bottom of the sealing mechanism 33 of each chamber 11-13 which lowers to separate and seal the chambers 11-13. Preferably, the air jets 36 are positioned at alternating angles, such as, for example, about 45°. The air jets 36 may utilize compressed air created within the air compressor 61, or alternatively may use a separate air compressor 61. Alternatively, brushes may be employed to brush away the residue. The brushes of this embodiment may be located at the bottom of the sealing mechanism 33 between chambers 11-13, which rotate to clean the contact points of the seal.

In an alternative or conjunctive embodiment, as seen in FIG. 6, an electronic eye 38 is provided at or near the dividing wall of each chamber. The electronic eye 38 of the present invention may provide two functions. A first function of the electronic eye 38 is to determine the distance the conveyor belt 20 must rotate before the silicon strip 24 and the sealing mechanisms 33 will be aligned. A second benefit of the electronic eye 38 provides a source for determining whether the air jets 36 of the present invention have sufficiently wiped the silicon strip 24 to provide for a tight seal with the silicon strip 24 and sealing mechanisms 33.

When a particularly dry product or yield is required or the starting suspension is greater than about 90% water, the container 10 should be subdivided into multiple chambers 11-13. Preferably, chamber 11 is provided to pre-strain primarily aqueous suspension prior to chambers 12-13. The present invention allows for the discretion of the operator to bypass the first chamber 11 to more efficiently use resources to dewater the suspension. Chamber 11 may be bypassed by design of the system or in operation through the control system 70.

A pressure differential is created across the membrane 31 of the lid 30 in the chamber 11-13 by pulling a vacuum 50 on one side of the membrane 31. A standard vacuum 50 pump, motor, or the like creates a vacuum 50 chamber through at least one drain 17 located at the base of the chamber, and applies a negative pressure onto the membrane 31. Alternatively, before initiating the vacuum 50, it is also possible to allow for gravity to effect naturally some initial liquid separation, which saves energy.

The chamber and conduits may be arced or flat in design. The preferably arced design of the conduits 15 provide a substantially even differential pressure to be distributed across the surface of the contents and enable more even distribution of solids captured by the filter 21. In this way, the atmospheric pressure externally applied to the membrane 31 and the vacuum 50 pressure applied to the inside of the membrane 31 within the chamber 11-13 exerts a force causing the suspension to be "squeezed" between the membrane 31 and the filter 21. Within a single 6 foot (1.83 m) by 12 foot (3.66 m) chamber 11-13, approximately 11.3 psi (77.9 kPa) can be achieved which is approximately 114,000 lbs (51.7 metric tons) of force at 23 inches of mercury (77.9 kPa) pressure. Overall, a 36 foot (11.0 m) by 6 foot (1.83 m) container can achieve approximately 342,000 lbs (155.1 metric tons) of force. This applied squeezing forces liquid, such as water, from the chamber 11-13, through the filter 21, into the conduits 15, and through the at least one drain 17 for recovery. However, the solids are prevented from passing as the result of the filter 21. The remaining suspension may then undergo further dewatering processing.

In one embodiment, a sealed rigid cap may be placed over the membrane 31 in a first chamber 11. The application of a rigid cap above the membrane 31 enables pressure to be added to the membrane 31 from above. In a preferred embodiment, the rigid cap exerts about 6 psi (41.4 kPa) of pressure on the membrane 31. In this preferred embodiment, within a first 6 foot (1.83 m) by 12 foot (3.66 m) chamber 11, approximately 17.3 psi (119.3 kPa) can be achieved (11.3 psi (77.9 kPa) from the vacuum 50 and 6 psi (41.4 kPa) from the cap) which is 179,366 lbs (81.4 metric tons) of force at 23 inches of mercury (77.9 kPa) pressure.

Figure 7:
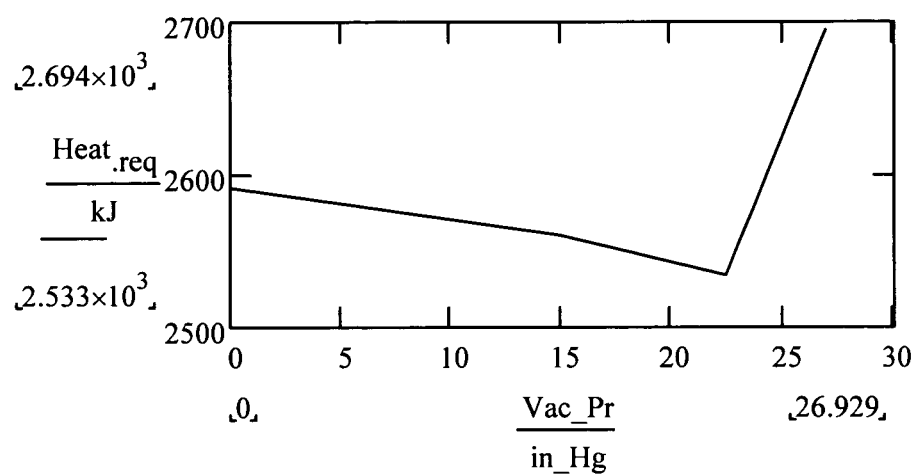
FIG. 7 shows a graph depicting heat and pressure of the system.

In a second and subsequent chambers 12-13, compressed and heated air injection is applied in conjunction with a vacuum 50, and one or more of radiant heat 60 or microwave radiation. The vacuum 50 is located at the bottom of each chamber 11-13. One or more vacuums 50 may be attached to a single chamber. Each vacuum 50 is attached to the chamber 11-13 through at least one drain 17. In a preferred embodiment, the vacuum 50 of each chamber 11-13 is controlled separately. The vacuum 50 of the present invention preferably creates a pressure within the chamber 11-13 of about 19 to 23 inches of mercury (64.3-77.9 kPa) pressure vacuum and more preferably no more than 23 inches of mercury (77.9 kPa) pressure during the drying process, which equates to about 35% of atmospheric pressure. As seen in FIG. 7, 23 inches of mercury (77.9 kPa) pressure provides the greatest efficiency of the system. Twenty-three (23) inches of mercury (77.9 kPa) pressure represents the pressure at which the minimum total energy (heat) is needed to boil water. Beyond approximately 23 inches of mercury (77.9 kPa) pressure, the energy required to vaporize water begins to increase substantially, as shown in FIG. 7, where 0 inches (0 kPa) represents atmospheric pressure and 30 inches (101.6 kPa) is a total vacuum 50. By providing for a reduced boiling point, water is more easily removed from the suspension. The vacuum 50 reduces the boiling temperature of water from 212° F. (100° C.) under atmospheric conditions or about 0 inches of mercury (0 kPa) pressure to about 146° F. (66.3° C.) at 23 inches of mercury (77.9 kPa) pressure. In a preferred embodiment, the vacuum 50 within the chamber 11-13 is able to achieve 23 inches of mercury (77.9 kPa) pressure within about 10 seconds.

The vacuum 50 provides for a more efficient endothermic process as the system absorbs energy during the phase shift from liquid to gas. The differences in the enthalpy of vapor and liquid at the saturation temperature is defined as latent heat. The vacuum 50 will use negative pressure to create a pressure differential across the membrane 31, which in turn decreases the enthalpy of both the vapor and of the liquid. Beyond 23 inches of mercury (77.9 kPa) pressure, the decrease of the enthalpy of the liquid is greater than that of the decrease of the enthalpy of the vapor, and therefore the latent heat required for vaporization increases. Latent heat, defined as the energy needed for phase change, such as, for example, from liquid to gas, requires energy to overcome the attraction between water particles, when transitioning into a gas or vapor. Applying a vacuum 50 in the range of 19-23 inches of mercury (64.3-77.9 kPa) pressure achieves the lowest levels of required latent heat for vaporization of water. Applying the present invention to a suspension provides the most efficient means of dewatering the suspension.

Figure 8C:
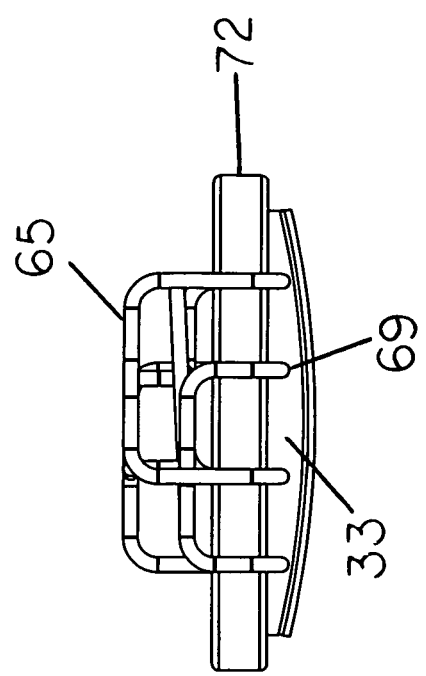

An air compressor 61 is attached to chamber 11-13 via a manifold 65 or air distribution tubing or pipes. The air compressor 61 preferably compresses the air to a density of about 100 psi (689 kPa) and stores the compressed air. The manifold 65 redirects the airflow of the air compressor 61 from a single stream to a plurality of inlet pipes 69 connected to the chamber 11-13 by inlets 68. In one embodiment, the manifold 65 redirects the airflow of the air compressor 61 to a plurality of heaters 66 connected to the inlet pipes 69. The inlets 68 should be arrange to provide for equal pressure distribution by the air compressor 61 to each of the heaters 66 by evenly dividing the flow of air into separate channels at the point of entry into the heaters 66. In another embodiment, the airflow of the air compressor 61 may be directed to a heater 66 before being redirected into a plurality of channels by the manifold 65. The manifold 65 of the present invention may have a linear or radial design having equally spaced inlets 68 across the manifold 65. In a preferred embodiment, the manifold 65 includes a solenoid, such that the flow of air may be directed into different channels at different times and "pulse" the air flow through a given inlet 68. In a preferred embodiment, as shown in FIGS. 8(b) and 8(c), air inlet pipes 69 pass through the sealing mechanism 33 attached to the lid 30 to avoid puncturing the membrane 31. Other arrangements of the manifold 65 and inlet pipes 69 should be readily apparent to those skilled in the art, provided that consideration is given to the even distribution of airflow from the air compressor 61. It may be beneficial, for example, to provide channels of various size to more evenly disperse the airflow in a beneficial way. Further, as the air is heated prior to entering the chamber, the manifold 65 is preferably insulated to reduce heat loss.

In a preferred embodiment, the heat from the compression of air is used to reduce energy usage. Most industrial air compressors cool the air for storage once compressed. The act of compressing air molecules naturally increases the kinetic energy, and thus temperature, of the air. By bypassing or removing any cooling devices associated with the air compressor 61, less or no additional energy is required to elevate the air temperature to its desired range for injection.

Once the air is compressed, the air is then cycled into an air drying system. Air naturally consists of moisture particles. As air is compressed, additional moisture is created. An air drying system should be located after the air compressor 61 prior to being heated and injected into the chamber 11-13. The air driers remove the moisture from the air, which reduces the likelihood of corrosion in the piping within the chambers 11-13.

After the air is dried, it may be cycled back into the chamber 11-13 to be preheated. Preferably, tubes and pipes of air are directed within the container 10 near the radiant heating elements 60 source to provide preheated air of around 250° F. (121° C.). In a preferred embodiment, the air is then heated inline after preheating the air tubes through the container's 10 applied radiant heat 60 source. The inline heater 66 of the present invention may be designed to heat all of the air for a single chamber, or may be designed to use multiple inline heaters 66 for a single chamber. To reduce heat loss prior to injection, the inline heater 66 is preferably located near the inlets 68 at the point of contact with the suspension. The heater 66 preferably will not turn on unless inline airflow is present to prevent damage to the heater 66. The preheated air is heated to a temperature of about 450° F. (232° C.) such that after heat loss caused by transfer to the container 10, the fiberglass, or otherwise offset or lost, the temperature is within the range of 300° F. (149° C.) to 450° F. (232° C.) at the point of contact with the suspension.

Radiant heat 60 may be provided for increasing the temperature of the suspension contained in the chambers 11-13 and to expedite evaporation. In many applications, heating the product speeds the rate of drying by both increasing the rate of filtration and increasing the rate of evaporative drying. Furthermore, as pressure decreases the vaporization point of all liquids, the negative pressure enables low levels of induced heat to turn liquids into gas and be safely removed from the suspension.

For vaporization to occur, radiant heat 60 should be employed to container 10 to speed the process of separating the liquid from the solid in the suspension as mentioned above. As the pressure within the chambers 11-13 decreases to a preferable 23 inches of mercury (77.9 kPa) pressure, the vaporization point decreases to the preferred 146° F. (66.3° C.).

Radiant heat 60 may be introduced by externally heating the container 10, using infrared, or most preferably, as shown in FIG. 3, placing heating elements, such as coils or preferably, 4,000 W heating elements 60, positioned around or through the conduits 15 to prevent contact with the filter 21 and to avoid burning the suspension. The heating elements 60 should be located beneath the conveyor belt 20 and above the at least one drain 17. Radiant heat 60 provides the additional benefit of heating the suspension and the container 10. As the heat is introduced into the chamber in conjunction with the compressed heated air, the suspension is heated to the reduced vaporization point. Once the temperature of the suspension reaches an excess of 146° F. (66.3° C.) at 23 inches of mercury (77.9 kPa) vacuum pressure, the water within the suspension will begin to evaporate. In a preferred embodiment, the temperature within the chamber 11-13 is about 250° F. (121° C.), and over the preferred period of 6 minute cycle times within each chamber, the suspension will reach its reduced boiling point.

Additionally, to reduce heat loss within the chamber, the container 10 may have one or more of an outer shell or insulation 29. The outer shell may be constructed of materials, such as, for example, the same or similar material as the container 10. The insulation 29 may be constructed from a material, such as, for example, fiberglass or air. The outer shell should be slightly larger than the container 10. By using an outer shell or insulation 29, less radiant heat 60 is lost and the temperature within the chamber 11-13 is able to more quickly reach 250° F. (121° C.).

Microwave radiation, such as is provided by a Mazer® microwave, may be used to expedite the removal of liquids from the solids of the suspension. Microwave radiation, preferably at a frequency of about 2450 MHz, having a wavelength of 12.24 cm, acts to promote heating in areas with remaining water as it travels through drier areas of the suspension to reach and excite water molecules and trapped liquids to their boiling point. Microwave radiation is beneficial because it is able to pass through certain materials, such as, for example, dry dirt, while being unable to pass through others, such as, for example, metal. Microwave radiation is able to bounce within the chamber 11-13 between the membrane 31, seals and the filter 21 and rotate the water molecules to generate heat and therefore evaporate the water molecules in the suspension. Microwave radiation provides the ability to excite and heat liquid that may reside in pockets or are otherwise unaffected by the heated airflow or radiant heat 60. Microwave radiation expedites the drying process to allow the liquid to more quickly evaporate from the suspension.

The compressed and heated air is injected into the chamber 11-13 through the air inlets. In a preferred embodiment, the flow of injected air is pulsed, whereby the less than all of the inlets 68 will simultaneously receive airflow. The injection rate should not cause the vacuum 50 to be reduced to below 19 inches of mercury (64.3 kPa) pressure. In a preferred embodiment, an injection rate of greater than about 5,000 SCFH (141.6 cubic meters per hour at conditions 15.56° C. and 101.325 kPa) at 100 psi (689 kPa) should be injected into each chamber to heat the system while retaining the appropriate levels of vacuum 50 within the system. The inlets 68 of the present invention should be evenly spaced under the membrane 31 to provide even distribution of compressed heated air to the suspension from the air injected by the air compressor 61. Inlet pipes 69 connecting the manifold 65 to the inlets 68 pass through the membrane 31 or preferably through the rigid rim 72 of the lid 30 or the sealing mechanism 33 attached to the lid 30. Even pressure distribution to the inlets 68 is important to retain the efficiencies of the compressed air. To achieve even distribution of air to the inlets 68, the manifold 65 must be designed to equally receive airflow from the air compressor 61.

In a preferred embodiment, the inlets 68 of the present invention should be evenly spaced over the suspension. Even distribution from the inlets 68 provides for even expansion of the heated compressed air upon the suspension to provide the heating effect. As the air expands from its condensed state to an expanded state, a lower flow rate of air is able to efficiently heat a greater amount of the suspension. Due to the extreme difference in pressure of the compressed air and in the chamber 11-13, the air expands very rapidly. To achieve the desired effect, the inlets 68 of compressed air should be located directly on or very near the suspension. Due to the proximity of the heated air and the suspension, even distribution of air through the inlets 68 is important to the efficiency of the heated compressed air. In addition to the action of heated compressed air to transition interstitial and chemically bound water to vapor, the flow rate of the air as it enters the chambers 11-13 also acts to remove moisture by force. The movement of air through the suspension increases in flow rate due to changes in pressure. Consequently, the movement of air through the suspension acts to carry or transport the moisture through the filter 21 for removal. This flow-through drying process, in combination with the heat transitioning remaining moisture to vapor for removal, offers a very efficient means of drying a suspension.

The inlet pipes 69 of the present invention are located directly below the membrane 31 and each inlet pipe 69 includes a plurality of inlets 68. In one embodiment, as shown in FIG. 8(b)-(c), the present invention includes four parallel inlet pipes 69, each inlet pipe 69 including a sufficient number of inlets 68, such that the inlets 68 are no more than about 6 inches (15.24 cm) apart. The inlet pipes 69 may be of varied size to account for the preferred arc of the chamber. Preferably, inlets 68 should be positioned alternately at a downward angle, preferably at alternating 45° angles. The size of the inlet 68 air hole is determined as a function of the thermodynamics of the air compressor 61, manifold 65 and inline heater. The inlet pipes 69 introduce compressed and heated air into the chamber 11-13 at the point of contact with the suspension. The inlet pipes 69 are made of a resilient material, such as, for example, stainless steel. Preferably, a geotextile, such as, for example, TEFLON® sheeting, is fitted around each inlet pipe 69 to prevent suspension from covering the inlet pipe 69 or entering the inlets 68. The geotextile of the present invention must be capable of withstanding extreme heat without catching fire, melting or otherwise decomposing and should allow for the free flow of air into the suspension.

As the air is injected, the air rapidly expands from its compressed state, such as, for example, 100 psi (689 kPa), through atmospheric pressure and into an expanded state, such as, for example, 23 inches of mercury (77.9 kPa) pressure. As the air expands, it covers a greater area and is better able to heat a greater amount of the suspension. The compressed air provides a lower flow rate of air to efficiently heat a significantly large volume of suspension, resulting in increased efficiency of the system.

The heat provided by the compressed air working in combination with the heat provided by the radiant heating elements 60 and the microwave causes the suspension to evaporate. The flow of injected air introduced from the air compressor 61 is quickly pulled through the suspension of the present invention by the vacuum 50. As the airflow is pulled through the at least one drain 17 and into a holding tank 51, the airflow carries both water and the vapors out of the chamber. The vacuum 50 of the present invention creates a mechanism by which interstitial and chemically bound liquids are vaporized and removed from the suspension, however, without a force, such as, for example, the airflow created by the compressed air, the vapors will not be removed from the chamber. Although a pressure differential across the membrane 31 creates a squeeze, effect which causes some of the liquids and vapors to be removed, the primary effect of the vacuum 50 results in a non-flow environment amongst the liquids and vapors, where molecules are free floating within the chamber 11-13 and are not transported through the filter 21 to the at least one drain 17 absent a flowing force, such as, for example, the expansion of compressed air. The compressed air flow-through drying process provides the dual benefit of heating the suspension approximately 50° F. (37° C.) more than radiant heat 60 alone, as well as removing vapors created by the heat of the compressed air, radiant heat 60 and microwave radiation.

Additionally, a mixer or agitator, such as a rotatable mixing blade, may be provided to churn the dried yield in the conveyor belt 20. In lieu of a mechanical mixer, it is possible in this or any of the embodiments disclosed to agitate the contents by applying the air jets 36 or reversing the vacuum 50 motor in order to cause air to flow back through the conduits 15, the filter 21 material 20 (which may or may not require opening a pressure release valve, depending on the relative permeability of the membrane 31 used). This would essentially provide a sparging function to the container 10.

The second and additional chambers 11-13 contain the filter 21 and the conduit design of the first chamber. The vacuum 50 and compressed and heated air of the second additional chambers 11-13 provide for the separation of the liquid from the solids of the suspension as the expanding air causes the liquids and vapor to be pushed through the filter 21. A separating force is used in connection with a filter 21 of the conveyor belt 20 which allows for the air and the liquids and vapor to pass, but prevents the solids of the suspension composition from passing there through. As the liquids and gases pass through the filter 21, the liquids are collected into the conduits 15 and stored separately within the holding container 10.

Figure 9:
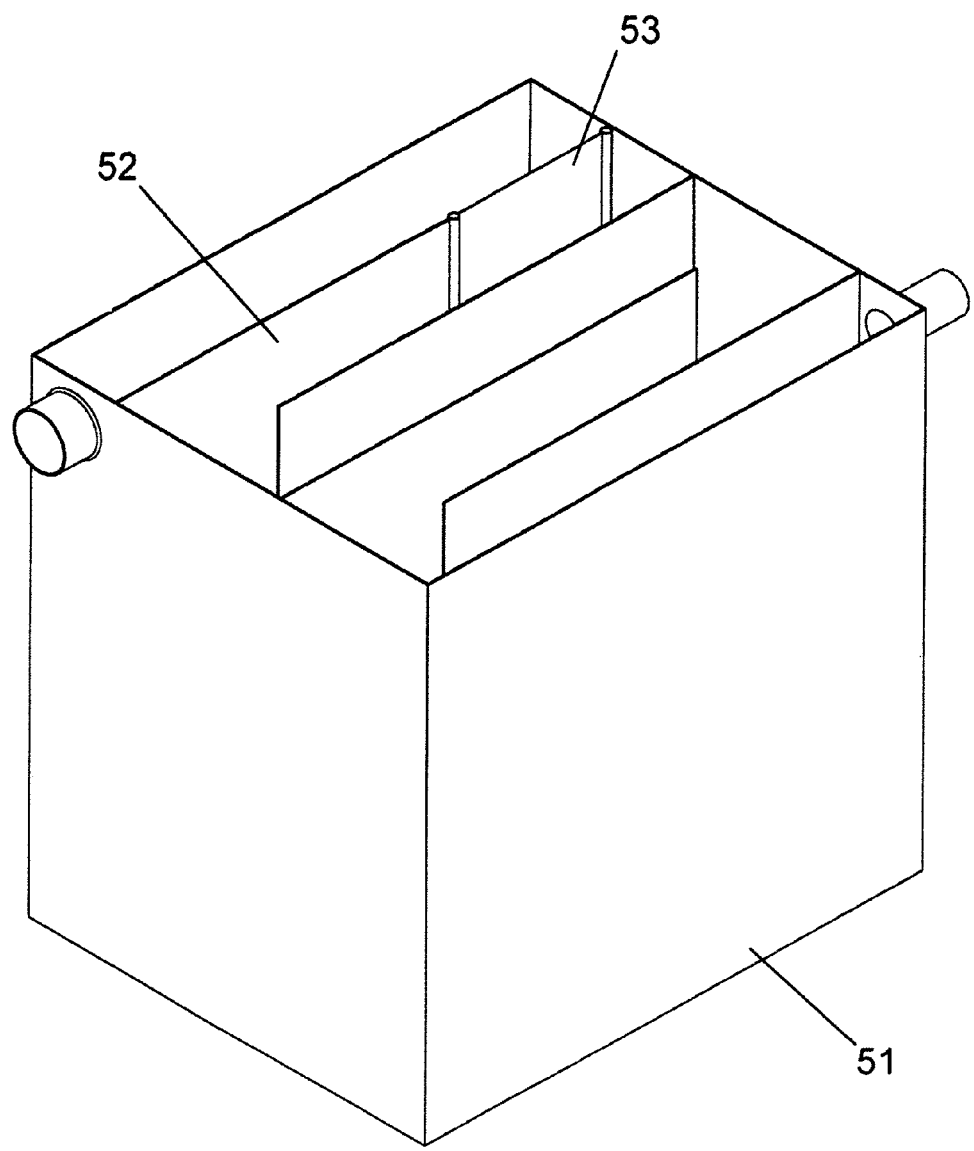
FIG. 9(a)-9(b) show a cross section of a holding tank.

The combined effects of the vacuum 50, the air compressor 61 and heat cause the liquids within the suspension to evaporate. A second benefit of the vacuum 50 is that the liquids and gases separated from the suspension are pulled through the filter 21, through the vacuum 50 tubes and into a holding tank 51. The holding tank 51 of the present invention incorporates the use of a series of baffles 52 which obstruct the flow of water between the at least one drain 17 an the vacuum 50. FIG. 9(a)-(b) shows the holding tank with the top wall removed. A baffle is a series of chambers connected at alternating ends by an open space to allow air to flow between the baffles 52. Between the baffles 52, a screen 53 is preferably provided for catching the liquid and vapor carried by the air from the chamber. As the air passes through the screen 53, the liquids and vapors strike the screen 53 and collect at the bottom of the holding tank 51. The tank of the present invention also contains a cold source to promote condensation, such as, for example, condensation pipes running cold water through the tank. In a preferred embodiment, water run through the condensation pipes is approximately 75° F. (23.9° C.). The tank provides a means to cause the gases and liquids being forced out of the suspension to cool and, in the case of gases, condense into liquids prior to being evacuated from the holding tank 51. Each chamber 11-13 may have it's own holding tank 51, each holding tank 51 is large enough to hold and efficiently cause to be condensed all of the liquids from the suspension removed from that chamber 11-13. If each chamber 11-13 has a separate holding tank 51, the first holding tank 51 must be large enough to hold all of the liquids from the mostly aqueous suspension, whereas the second and additional holding tanks 51 may be smaller because a progressively lessened amount of liquid is drained in each subsequent drying process. Holding tanks 51 may be emptied during or after each drying process, and may be done manually or automatically. Automated pumps or triggered pumps may be attached to each holding tank 51 to evacuate the tank. The exit point of the holding tank 51 should be below the current water level throughout the evacuation so that the evacuation does not interfere with or impede the vacuum 50 process.

Additional chambers 11-13 may be added as required until the remaining solids are sufficiently dry for their intended purpose, dependent upon such factors as volume, cycle times, level of liquid present in the initial suspension, chemical properties, the pressure and heat that can be achieved within the chamber 11-13 among other things. In a preferred embodiment, the liquid removal process lasts approximately 2-6 minutes for each chamber, however, the duration and the level of dryness may vary with varied chemical compositions of the suspension. A dryness measurement tool or sensor may be used within the product to detect whether additional chambers 11-13 are required to achieve the desired level of dryness. Alternatively, if less dryness or greater speed is desired, an embodiment of the present invention including two or only one chamber may be used. In a preferred embodiment, the present invention should be able to reduce a suspension consisting of an amount of liquid of 95% or more to 30% or less within three chambers 11-13. If a drier product is required, the process may be repeated multiple times or cycle times may be increased. Often, however, some remaining moisture is desirable, especially for products containing finer particulate matter, so that the fine solids can be unloaded and transported with minimal loss (that is, the remaining moisture serves as a binder).

Sensors and pressure release valves may be associated with the chamber 11-13 to prevent damage to the system from occurring. These valves may be set electronically to restrict the system from achieving greater than 23 inches of mercury vacuum 50 to prevent excessive force to conveyor and support structures 22. Sensors maintain optimum levels of vacuum 50 and heat. The pressure sensors may be used to detect and trigger the release valves to open and control the internal pressure or to reduce vacuum 50 power.

Figure 10:
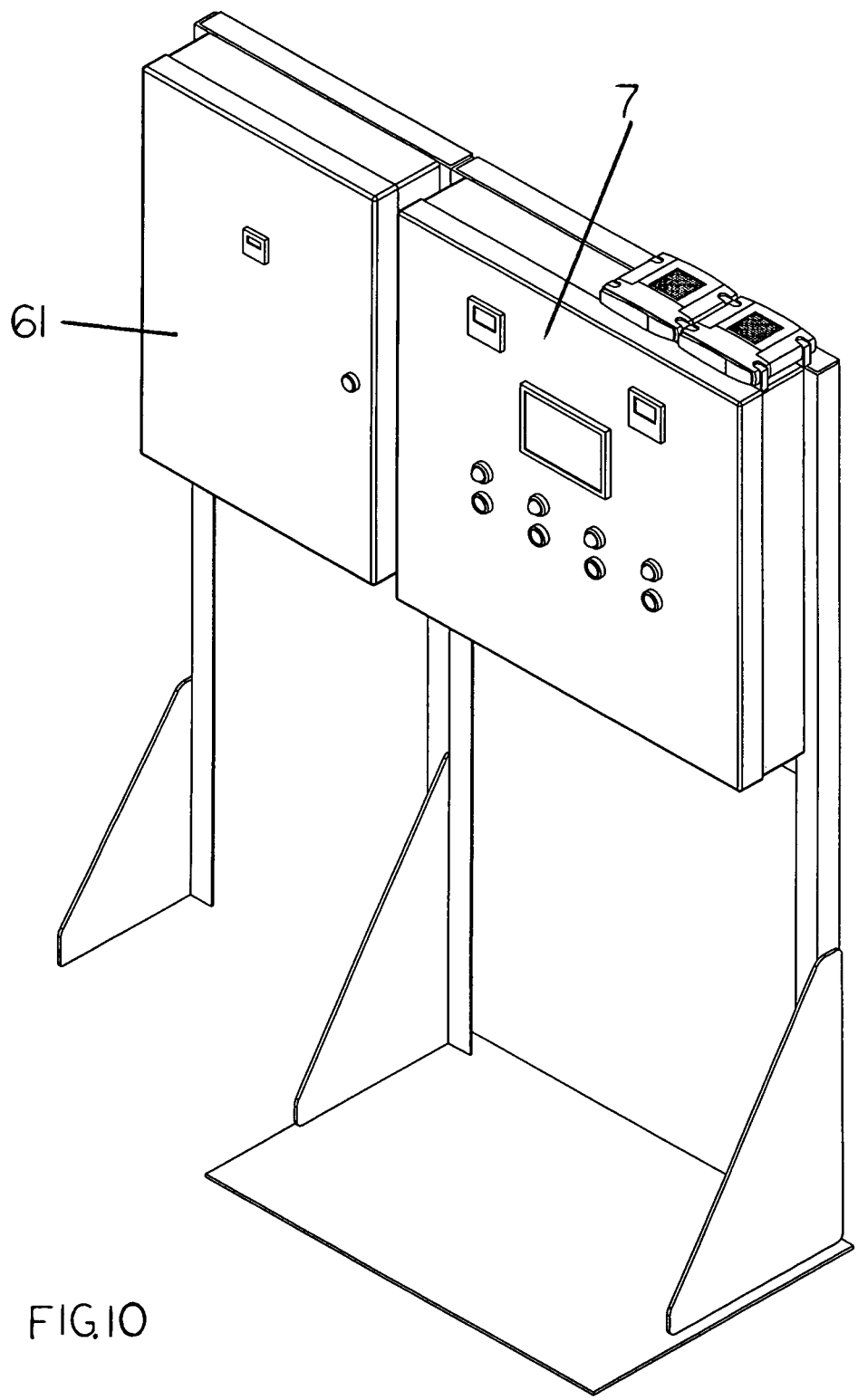
FIG. 10 shows a control system.

Preferably, the heat within the system is temperature controlled using readings from thermocouplers. In this embodiment, a thermocoupler measures the heat within the airflow being injected into the chamber. The thermocouplers may be located anywhere within the system, and most preferably is within the chamber, the suspension, holding tank 51 and vacuum 50 pump. The thermocouplers of the present invention may be wireless or wired, and may be supplemented with the use of probes. A control system 70, as perhaps is best understood with reference to FIG. 10, should be embodied in a programmable design, such as, for example, a programmable logic controller (PLC), may control the temperature based on the reading of the thermocouplers. The temperature control aspect of the present invention may be achieved automatically or manually. In a manual embodiment, valves are connected to the manifold 65 to increase or reduce airflow. In a preferred embodiment, temperature control is automatic. In this embodiment, airflow valves and heater output automatically adjust to temperatures to regulate air and volume entering the chamber.

Figure 11:
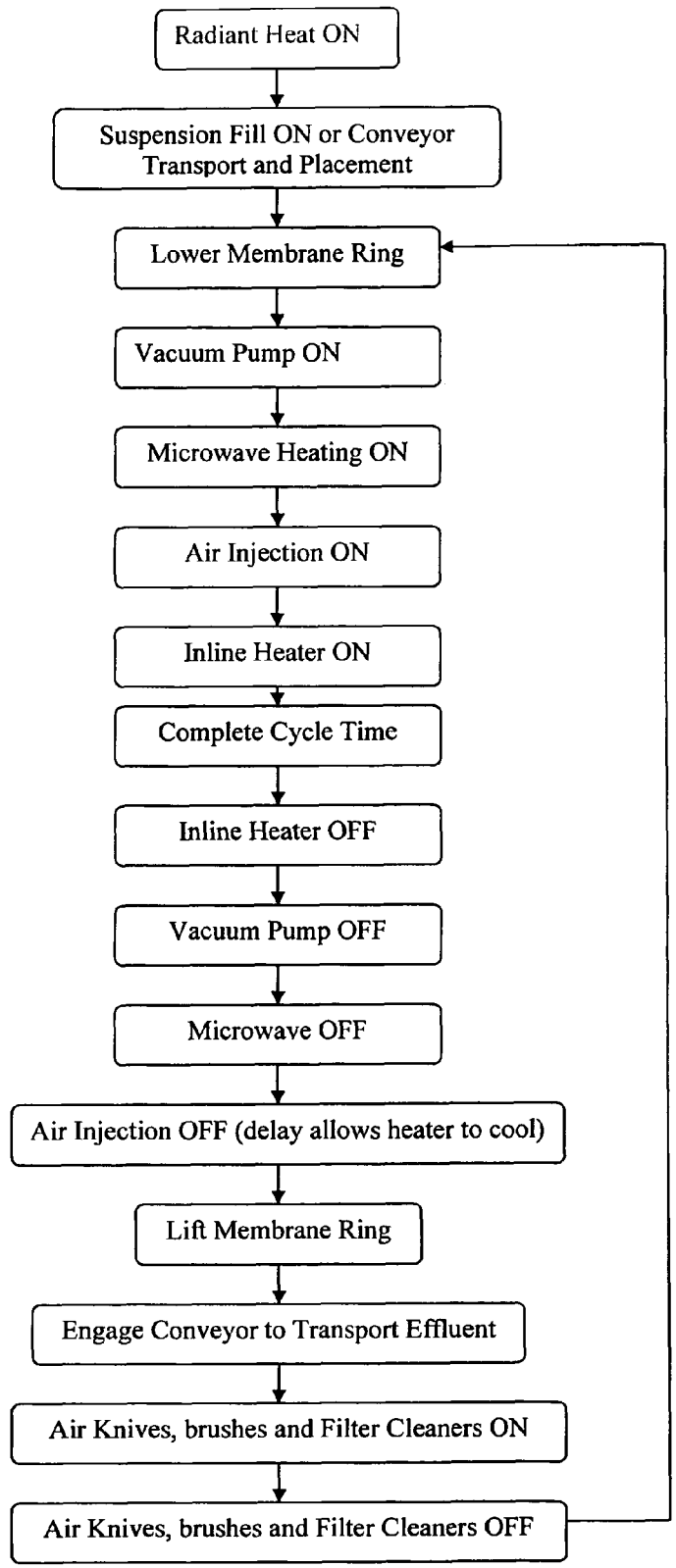
FIG. 11 shows a flowchart for the operation of the control system.

A control system 70 is provided which includes hardware and software for automating some or all processes, including but not limited to heating air, drying air, injecting air, applying a vacuum 50 pump, rotating the conveyor belt 20 through the container 10, lifting and lowering the lid 30, creating seals between chambers 11-13, among other processes. Sensors and automatic release valves may be used to regulate the optimum vacuum 50 pressure. The control system 70 should include Project Logic Controllers 23 (PLC's) to provide a logical course of operation. For example, FIG. 11 provides an example wherein radiant heat 60 is turned ON, suspension fill ON or conveyor transport and placement, lower membrane 31 ring, vacuum 50 pump ON, microwave heating ON (if applicable), air injection ON (possible pause to enable complete pressing of membrane 31 to suspension), inline heater ON, complete cycle time, inline heater OFF, vacuum 50 pump OFF, microwave OFF, air injection OFF (delay allows heater to cool), lift lid 30 and membrane 31, engage conveyor to transport suspension, air jets 36, brushes and filter 21 cleaners ON, air jets 36, brushes and filter 21 cleaners OFF, and repeat.

The control system 70 may provide for Wide Area Network (WAN) and Local Area Network (LAN) monitoring of the system and data from remote locations. WAN and LAN controls and networks can be used to transfer data from the PLC's, gas chromography (or mass spectrometers), and power sources to enable remote reporting, monitoring and to perform maintenance and operations remotely. WAN and LAN controls and networks additionally provide real-time data and system performance to be viewed and recorded for individual systems. System performance data can be used to indicate the needs for service, maintenance and repair.

Additionally, the control system 70 should be used to automate holding tank 51 discharge, all air compressors 61, air driers, flow switches to the inline heater, vacuum 50 pump and air compressor 61, condensation mechanics on the holding tank 51, thermocouple readings, gas chromography data delivery, wide area network (WAN) conditions and local area network (LAN) monitoring, parameters of the inline heaters 66, and enable safety devices to stop the process in the case of low flow rates, overheating, low vacuum 50 pressure, electrical malfunction, blockage, or other damaging events.

In a preferred embodiment, the present invention includes a gas chromography or mass spectrometer for the purpose of analyzing the contents of the removed vapors and holding tank 51. Analysis of gasses removed from the system enable operators to separate and capture for use or for resell the byproducts of the vaporization process. Further, reading the gasses and their volumes at the holding tank 51 provides a safety mechanism to ensure safe levels of liquids or gasses in the system as well as providing a means by which to document the level of liquids and gasses being introduced into the system and released into the environment. Readings are used to ensure the proper use of the system and to alarm when hazardous or controlled substances are placed into the system for processing.

Once the suspension is sufficiently dried, the remaining solids may be removed from the chamber 11-13. Removal may be accomplished by opening the top seal and then simply scooping out the solids from the top opening 16, or preferably having the conveyor belt 20 rotate the product out of the container 10 into a solids receptacle 26 provided at the end of the conveyor belt 20 outside of the container 10. Preferably, once the suspension is removed from the conveyor belt 20, the conveyor belt 20 will pass the filter 21 through an external cleaning station, providing an automated cleaning process to minimize the buildup of the suspension within the porous filter 21 of the conveyor belt 20 or filter 21 and impede the dewatering process. The conveyor belt 20 should be a loop design, which would allow for the external cleaning station to act upon the conveyor belt 20 prior to reentering the container 10. The external cleaning station is located after the solids receptacle 26, and preferably is located beneath the container 10. The cleaning station preferably cleans the conveyor belt 20 during each two to six minute drying cycle. The cleaning station should use one or more of air jets 36, solvents, and brushes to remove suspension from the filter 21 or conveyor belt 20.

In order to ease the storage process, a compactor 30 may be provided for the receptacle 26 bin after the last chamber 11-13 for compacting the remaining product. The compactor 30 is associated with a solids receptacle 26 on which the remaining substantially dried product is placed, and may pass through a compactor 30.

The foregoing description provides illustration of the inventive concepts. The descriptions are not intended to be exhaustive or to limit the disclosed invention to the precise form disclosed. Modifications or variations are also possible in light of the above teachings. The embodiments described above were chosen to provide the best application to thereby enable one of ordinary skill in the art to utilize the inventions in various embodiments and with various modifications as are suited to the particular use contemplated. All such modifications and variations are within the scope of the invention.

The foregoing detailed description is given primarily for clearness of understanding and no unnecessary limitations are to be understood therefrom for modifications can be made by those skilled in the art upon reading this disclosure and may be made without departing from the spirit of the invention and scope of the appended claims.

What is claimed is:

1. A method of extracting liquid from a suspension, comprising the steps of:
   a. transporting a suspension into a first chamber on a conveyor belt, said conveyor belt including a filter attached thereto, and said first chamber including a drain below the conveyor belt;
   b. sealing said first chamber with a lid, said lid including a pliable membrane contacting said suspension;
   c. applying a vacuum to said first chamber via said drain, whereby said vacuum:
      1. applies negative pressure to said suspension, such that said negative pressure forces liquid components of said suspension through said filter, and
      2. applies negative pressure to said pliable membrane, such that said pliable membrane exerts positive pressure against said suspension, such that said positive pressure forces liquid components of said suspension through said filter;
   d. unsealing said first chamber;
   e. transporting said suspension into a second chamber on the conveyor belt, said second chamber including a drain below the conveyor belt;
   f. sealing said second chamber with a lid, said lid including a pliable membrane contacting said suspension;
   g. applying a vacuum to said second chamber via said drain, whereby said vacuum:
      1. applies negative pressure to said suspension, such that said negative pressure forces liquid components of said suspension through said filter, and
      2. applies negative pressure to said pliable membrane, such that said pliable membrane exerts positive pressure against said suspension, such that said positive pressure forces liquid components of said suspension through said filter; and
   h. applying an airflow of heated compressed air to said suspension, whereby at least a portion of said airflow passes through said suspension such that heat from said airflow and decreased pressure from said vacuum transitions liquid components of said suspension into vapor phase and expansion of said airflow transports said vapor out of said second chamber via said drain.

2. The method of claim 1, wherein the step of applying a vacuum to said second chamber via said drain further comprises applying microwave heating to said suspension.

3. The method of claim 1, wherein the step of transporting said suspension into the first chamber further comprises applying radiant heat to said suspension in said first chamber, and wherein the step of transporting said suspension into the second chamber further comprises applying radiant heat to said suspension in said second chamber.

4. The method of claim 1, wherein said vacuum in said first chamber and in said second chamber is a pressure of about 19-23 inches of mercury (64.3-77.9 kPa), and said vacuum in said second chamber is maintained during the step of applying an airflow of heated compressed air to said suspension in said second chamber.

5. The method of claim 1, wherein said airflow of heated compressed air is applied to said suspension through a plurality of spaced inlets.

6. The method of claim 1, wherein a solenoid pulses said airflow of heated compressed air through a manifold such that less than all of said inlets simultaneously receive airflow.

7. The method of claim 1, wherein said suspension reaches a temperature of at least 146° F. (66.3° C.).

8. A method of extracting liquid from a suspension, comprising the steps of:
   a. transporting a suspension into a first chamber on a conveyor belt, said belt being made of a semi-permeable material, such that liquid components can pass through the conveyor belt, while solid components are retained on a surface of the conveyor belt, and said first chamber including a drain below the conveyor belt;
   b. sealing said first chamber with a lid, said lid including a pliable membrane contacting said suspension;
   c. applying a vacuum to said first chamber via said drain, whereby said vacuum:
      1. applies negative pressure to said suspension, such that said negative pressure forces liquid components of said suspension through said conveyor belt, and
      2. applies negative pressure to said pliable membrane, such that said pliable membrane exerts positive pressure against said suspension, such that said positive pressure forces liquid components of said suspension through said conveyor belt;
   d. unsealing said first chamber;
   e. transporting said suspension into a second chamber on the conveyor belt, said second chamber including a drain below the conveyor belt;
   f. sealing said second chamber with a lid, said lid including a pliable membrane contacting said suspension;
   g. applying a vacuum to said second chamber via said drain, whereby said vacuum:
      1. applies negative pressure to said suspension, such that said negative pressure forces liquid components of said suspension through said conveyor belt, and
      2. applies negative pressure to said pliable membrane, such that said pliable membrane exerts positive pressure against said suspension, such that said positive pressure forces liquid components of said suspension through said conveyor belt; and
   h. applying an airflow of heated compressed air to said suspension, whereby at least a portion of said airflow passes through said suspension such that heat from said airflow and decreased pressure from said vacuum transitions liquid components of said suspension into vapor phase and expansion of said airflow transports said vapor out of said second chamber via said drain.

9. The method of claim 8, wherein the step of applying a vacuum to said second chamber via said drain further comprises applying microwave heating to said suspension.

10. The method of claim 8, wherein the step of transporting said suspension into the first chamber further comprises applying radiant heat to said suspension in said first chamber, and wherein the step of transporting said suspension into the second chamber further comprises applying radiant heat to said suspension in said second chamber.

11. The method of claim 8, wherein said vacuum in said first chamber and in said second chamber is a pressure of about 19-23 inches of mercury (64.3–77.9 kPa) and said vacuum in said second chamber is maintained during the step of applying an airflow of heated compressed air to said suspension in said second chamber.

12. The method of claim 8, wherein said airflow of heated compressed air is applied to said suspension through a plurality of spaced inlets.

13. The method of claim 8, wherein a solenoid pulses said airflow of heated compressed air through a manifold such that less than all of said inlets simultaneously receive airflow.

14. The method of claim 8, wherein said suspension reaches a temperature of at least 146° F. (66.3° C.).

* * * * *